(12) United States Patent
McCoy et al.

(10) Patent No.: US 11,992,761 B2
(45) Date of Patent: *May 28, 2024

(54) ARTIFICIAL INTELLIGENCE (AI) CONTROLLED CAMERA PERSPECTIVE GENERATOR AND AI BROADCASTER

(71) Applicant: Sony Interactive Entertainment Inc., Tokyo (JP)

(72) Inventors: Charles McCoy, San Diego, CA (US); True Xiong, San Diego, CA (US); Nathan Blaine Morgan, Escondido, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/463,468

(22) Filed: Aug. 31, 2021

(65) Prior Publication Data

US 2021/0387089 A1     Dec. 16, 2021

Related U.S. Application Data

(63) Continuation of application No. 16/584,842, filed on Sep. 26, 2019, now Pat. No. 11,103,782.

(51) Int. Cl.
*A63F 13/525*     (2014.01)
*A63F 13/35*      (2014.01)
(Continued)

(52) U.S. Cl.
CPC .......... *A63F 13/5258* (2014.09); *A63F 13/35* (2014.09); *A63F 13/86* (2014.09); *A63F 13/525* (2014.09)

(58) Field of Classification Search
None
See application file for complete search history.

(56) References Cited

U.S. PATENT DOCUMENTS

2007/0117635 A1   5/2007  Spanton et al.
2012/0276992 A1*  11/2012  Moinuddin .......... A63F 13/798
                                                    463/31
(Continued)

OTHER PUBLICATIONS

ISR PCT/US2020/049564, dated Nov. 16, 2020, 12 pages.
CN Application No. 202080081541.5, dated Oct. 31, 2022, 7 pages.

*Primary Examiner* — Damon J Pierce
(74) *Attorney, Agent, or Firm* — PENILLA IP, APC

(57) ABSTRACT

A method for generating broadcasts including receiving game state data and user data of players participating in a gaming session of a video game. A spectator zone-of-interest in the gaming session is identified having a scene of a virtual gaming world that is viewable from camera perspectives in the virtual gaming world. Statistics and facts are generated for the gaming session based on the game state data and the user data using a first AI model trained to isolate game state data and user data that are of interest by spectators. Narration is generated for the scene using a second AI model configured to select statistics and facts from the statistics and facts generated using the first AI model, the selected statistics and facts having a highest potential spectator interest as determined by the second AI model configured to generate the narration using the selected statistics and facts.

20 Claims, 12 Drawing Sheets

(51) Int. Cl.
*A63F 13/5258* (2014.01)
*A63F 13/86* (2014.01)

(56) References Cited

U.S. PATENT DOCUMENTS

| | | |
|---|---|---|
| 2014/0038708 A1 | 2/2014 | Davison et al. |
| 2016/0361658 A1 | 12/2016 | Osman et al. |
| 2017/0065889 A1 | 3/2017 | Cheng |
| 2017/0106283 A1 | 4/2017 | Malyuk et al. |
| 2017/0157512 A1* | 6/2017 | Long .................... A63F 13/497 |
| 2018/0357508 A1* | 12/2018 | Cui ...................... G06F 40/216 |
| 2018/0361258 A1* | 12/2018 | Malyuk ................ A63F 13/847 |
| 2020/0206640 A1 | 7/2020 | Myhill |

* cited by examiner

| Potential Spectator Zones of Interest 312 | Camera Perspectives A - C 323 | | |
|---|---|---|---|
| Spectator Zone of Interest 312-1 | Camera Perspective 323-1A | Camera Perspective 323-1B | Camera Perspective 323-1C |
| Spectator Zone of Interest 312-2 | Camera Perspective 323-2A | Camera Perspective 323-2B | Camera Perspective 323-2C |
| Spectator Zone of Interest 312-3 | Camera Perspective 323-3A | Camera Perspective 323-3B | Camera Perspective 323-3C |

ARTIFICIAL INTELLIGENCE (AI) CONTROLLED CAMERA PERSPECTIVE GENERATOR AND AI BROADCASTER

CLAIM OF PRIORITY

This application is a continuation of and claims priority to and the benefit of commonly owned, patent application U.S. Ser. No. 16/584,842, filed on Sep. 26, 2019, entitled "Artificial Intelligence (AI) Controlled Camera Perspective Generator And AI Broadcaster," the disclosure of which is incorporated herein in its entirety for all purposes.

CROSS REFERENCE TO RELATED APPLICATIONS

This application is related to application Ser. No. 16/526,824, filed on Jul. 30, 2019, entitled "Local Game Execution for Spectating and Spectator Game Play," which is hereby incorporated by reference in its entirety. This application is related to application Ser. No. 16/584,829, filed on Sep. 26, 2019, entitled "Artificial Intelligence (AI) Controlled Camera Perspective Generator and AI Broadcaster," which is hereby incorporated by reference in its entirety.

TECHNICAL FIELD

The present disclosure is related to video games or gaming applications. Among other things, this disclosure describes methods and systems for selecting and/or generating one or more views of a scene of gaming session of a video game and generating a broadcast of the one or more views for streaming to one or more spectators.

BACKGROUND OF THE DISCLOSURE

Video gaming streaming is gaining popularity. Spectators have access to both highly watched events featuring professional gamers as well as regular gamers posting their game plays. The spectators can access live streaming of gaming sessions, as well as streams of previous gaming sessions.

Productions of popular events include professional broadcasters providing play by play of the corresponding gaming session. For example, professional broadcasters of an event are fed multiple feeds of the gaming session and various facts associated with the gaming session. The feeds may be taken from views of the game generated for one or more players in the gaming session. Facts may be surfaced by the executing game, or by human assistants that are constantly searching for interesting facts about players and/or the gaming session. The multiple feeds of the gaming session may be directed to different players in the gaming session. The professional broadcaster is able to choose which feeds to show at what time, and to provide commentary using the facts that are associated with the gaming session. As such, spectators to these live events experience a professional produced show including interesting and the best viewpoints into the gaming session along with broadcasters that make the show even more exciting to watch.

Spectators may also enjoy streaming of gaming sessions of regular gamers. Some of these streams do not include any narration, and may just include views of the gaming session as displayed on a screen of a player. Other streams of gaming sessions may include commentary, such as commentary provided by a player while that player is playing a gaming application. In a sense, the player is providing a running commentary during the gaming session. However, the popularity of streams of gaming sessions of regular gamers may be limited. For example, spectators of these streams may tire of watching a gaming session that does not include any commentary, or may avoid streams that do not provide commentary. In addition, spectators of these streams may also tire of the running commentary provided by a player of the gaming session because the player is focused solely on his or her game play. The spectator may wish to hear about other players in the gaming session, or to hear other insights into the gaming session that the commentating player is unaware. For example, the spectator may wish for background information to the gaming session, such as those provided by professional broadcasters of live sporting events or gaming events. Or the spectator may wish to view the scenes showing game plays of other players along with interesting facts corresponding to their scenes. Basically, the spectators would like to have professional human broadcasters for the streaming of gaming sessions of regular gamers, which is logistically and economically impractical.

It is in this context that embodiments of the disclosure arise.

SUMMARY

Embodiments of the present disclosure relate to the generation of one or more renderings of a scene of a gaming application through artificial intelligence (AI), and further relate to the generation of narration for the scene and/or the renderings of the scene of the gaming application through AI.

In one embodiment, a method for generating views of a game is disclosed. The method including receiving game state data and user data of one or more players participating in a gaming session of a video game being played by the one or more players. The method including identifying a spectator zone-of-interest in the gaming session, the spectator zone-of-interest having a scene of a virtual gaming world of the video game that is viewable from one or more camera perspectives in the virtual gaming world. The method including identifying a first camera perspective of the spectator zone-of-interest based on a first AI model trained to generate one or more corresponding camera perspectives of corresponding scenes of corresponding spectator zones-of-interest.

In another embodiment, a non-transitory computer-readable medium storing a computer program for generating views of a game is disclosed. The computer-readable medium including program instructions for receiving game state data and user data of one or more players participating in a gaming session of a video game being played by the one or more players. The computer-readable medium including program instructions for identifying a spectator zone-of-interest in the gaming session, the spectator zone-of-interest having a scene of a virtual gaming world of the video game that is viewable from one or more camera perspectives in the virtual gaming world. The computer-readable medium including program instructions for identifying a first camera perspective of the spectator zone-of-interest based on a first AI model trained to generate one or more corresponding camera perspectives of corresponding scenes of corresponding spectator zones-of-interest.

In still another embodiment, a computer system is disclosed, the computer system including a processor and memory, wherein the memory is coupled to the processor and having stored therein instructions that, if executed by the computer system, cause the computer system to execute a method for generating views of a game. The method including receiving game state data and user data of one or more players participating in a gaming session of a video game being played by the one or more players. The method including identifying a spectator zone-of-interest in the gaming session, the spectator zone-of-interest having a scene of a virtual gaming world of the video game that is viewable from one or more camera perspectives in the virtual gaming world. The method including identifying a first camera perspective of the spectator zone-of-interest based on a first AI model trained to generate one or more corresponding camera perspectives of corresponding scenes of corresponding spectator zones-of-interest.

In another embodiment, a method for generating broadcasts is disclosed. The method including receiving game state data and user data of one or more players participating in a gaming session of a video game being played by the one or more players. The method including identifying a spectator zone-of-interest in the gaming session, the spectator zone-of-interest having a scene of a virtual gaming world of the video game that is viewable from one or more camera perspectives in the virtual gaming world. The method including generating statistics and facts for the gaming session based on the game state data and the user data using a first AI model trained to isolate game state data and user data that are likely of interest by one or more spectators. The method including generating narration for the scene of the spectator zone-of-interest using a second AI model configured to select statistics and facts from the statistics and facts that are generated using the first AI model, the selected statistics and facts having a highest potential spectator interest as determined by the second AI model, the second AI model configured to generate the narration using the selected statistics and facts.

In another embodiment, a non-transitory computer-readable medium storing a computer program for generating broadcasts is disclosed. The computer-readable medium including program instructions for receiving game state data and user data of one or more players participating in a gaming session of a video game being played by the one or more players. The computer-readable medium including program instructions for identifying a spectator zone-of-interest in the gaming session, the spectator zone-of-interest having a scene of a virtual gaming world of the video game that is viewable from one or more camera perspectives in the virtual gaming world. The computer-readable medium including program instructions for generating statistics and facts for the gaming session based on the game state data and the user data using a first AI model trained to isolate game state data and user data that are likely of interest by one or more spectators. The computer-readable medium including program instructions for generating narration for the scene of the spectator zone-of-interest using a second AI model configured to select statistics and facts from the statistics and facts that are generated using the first AI model, the selected statistics and facts having a highest potential spectator interest as determined by the second AI model, the second AI model configured to generate the narration using the selected statistics and facts.

In still another embodiment, a computer system is disclosed, the computer system including a processor and memory, wherein the memory is coupled to the processor and having stored therein instructions that, if executed by the computer system, cause the computer system to execute a method for generating broadcasts. The method including receiving game state data and user data of one or more players participating in a gaming session of a video game being played by the one or more players. The method including identifying a spectator zone-of-interest in the gaming session, the spectator zone-of-interest having a scene of a virtual gaming world of the video game that is viewable from one or more camera perspectives in the virtual gaming world. The method including generating statistics and facts for the gaming session based on the game state data and the user data using a first AI model trained to isolate game state data and user data that are likely of interest by one or more spectators. The method including generating narration for the scene of the spectator zone-of-interest using a second AI model configured to select statistics and facts from the statistics and facts that are generated using the first AI model, the selected statistics and facts having a highest potential spectator interest as determined by the second AI model, the second AI model configured to generate the narration using the selected statistics and facts.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 4 illustrates a user interface configured for selecting a camera perspective and a zone-of-interest of a gaming session of a gaming application, wherein the user interface includes one or more spectator zones-of-interest identified by the zone-of-interest AI model as being interesting to spectators, and one or more generated camera perspectives for those identified spectator zones-of-interest, the camera perspectives being identified using an AI camera perspective model as being interesting to spectators, in accordance with one embodiment of the present disclosure.

DETAILED DESCRIPTION

Figure 1A:
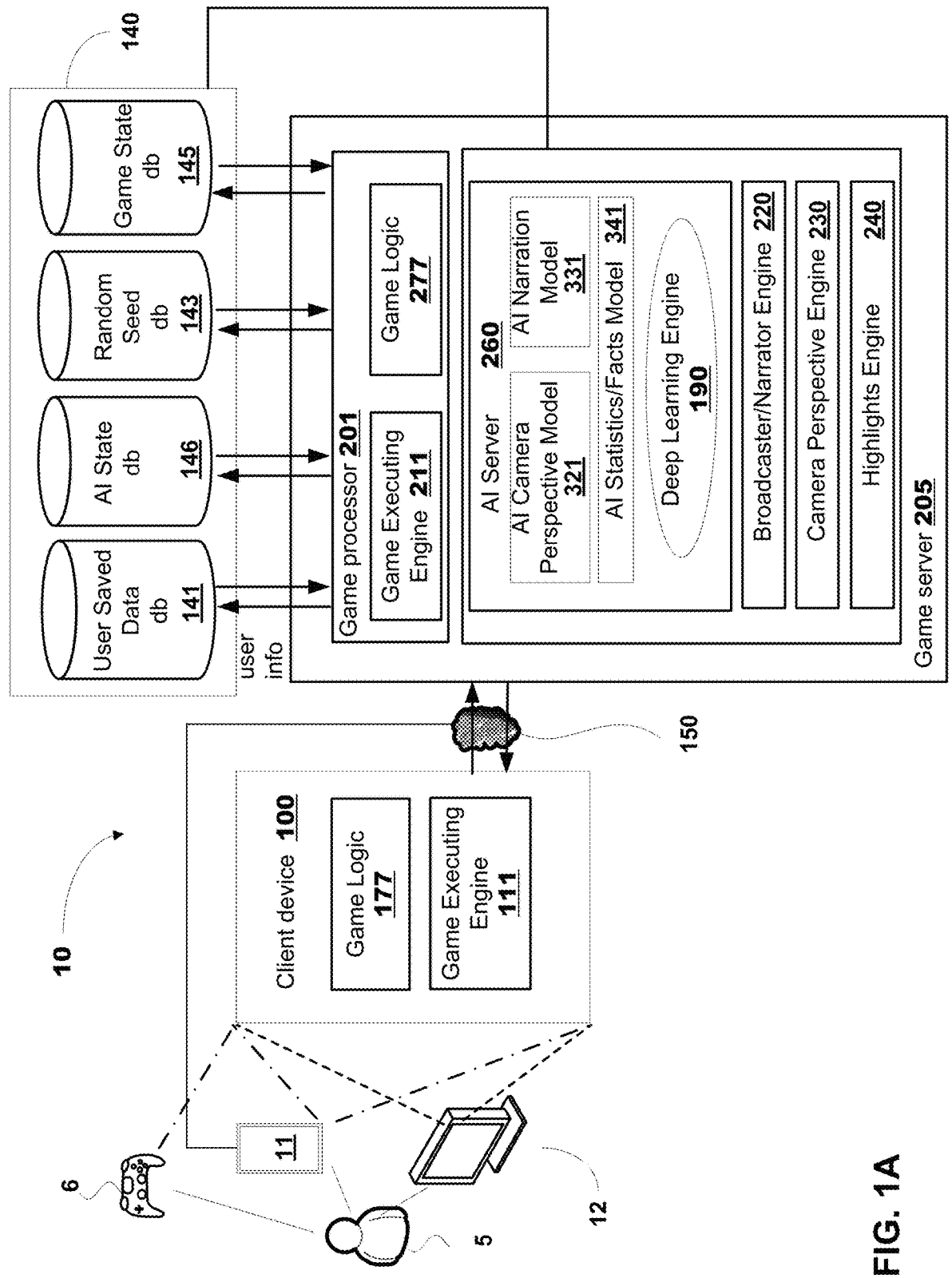
FIG. 1A illustrates a system used for AI controlled generation of camera perspectives of a scene in a gaming session of a video game, and for AI controlled generation of narration for the scene and/or the camera perspectives of the scene, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for the generation of one or more renderings of a scene of a gaming application through artificial intelligence (AI), and further relate to the generation of narration for the scene and/or the renderings of the scene of the gaming application through AI. In some embodiments, one or more renderings of a game are generated by artificial intelligence (AI). The AI can control camera angles to capture the most interesting action and can cut between angles to incorporate action that does not fit into a single view and to show the action from different points of view. The AI can take into account many aspects of the game and of player's interests to determine what action will be of the most interest to the audience. Different streams can be generated for different spectators. The AI can include replays of action in its streams so that spectators can see exciting actions again from different points of view, and can see actions that did not occur in a live camera view of the game. The AI can pick camera angles to include a full view of suspected action, such as an angle showing both a sniper and the target that the sniper is aiming at. The AI can add commentary to the game streams that it produces. In some embodiments, the AI commentary has a compelling personality. The commentary can communicate to the spectator why the AI thought the view that it chose was significant. For example, if the AI notices that a new player is in a position to kill an experienced player the AI can point out that fact and entice the spectator to see if the new player can actually take advantage of the situation to kill the more experienced player. In some implementations, an AI voice-over providing commentary can explain the action of an eSports game so that it will be understandable and exciting for a visually impaired spectator. In some embodiments, an AI providing commentary produces streams including commentary that are localized to viewers in multiple locations (i.e., considering local and/or regional customs), and may include commentary in different languages (including sign language). In some embodiments, highlight coverage is available after a game is over, such as in the generation of a highlight reel. Such coverage can be automatically generated based on AI choices. Such coverage can be based on what spectators chose to watch or rewind when watching the live game play. In still other embodiments, the coverage of a game may include the ability to see a map of the play area. Such a map can include meta-data, such as the location of all of the players that are still in the game and the location of the player eliminations. One way in which player eliminations can be highlighted on a map view is by flashing a bright red dot where the elimination took place.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

With the above general understanding of the various embodiments, example details of the embodiments will now be described with reference to the various drawings.

FIG. 1A illustrates a system 10 used for AI controlled generation of camera perspectives of a scene in a gaming session of a video game, and for AI controlled generation of narration for the scene and/or the camera perspectives of the scene, in accordance with one embodiment of the present disclosure. System 10 may also be configured for training the AI models used for generating the camera perspectives of the scene in the gaming session, and for generating the narration for that scene and/or the camera perspectives for that scene.

As shown in FIG. 1A, the video game (e.g., game logic 177) may be executing locally at a client device 100 of the user 5, or the video game (e.g., game logic 277) may be executing at a back-end game executing engine 211 operating at a back-end game server 205 of a cloud game network or game cloud system. The game executing engine 211 may be operating within one of many game processors 201 of game server 205. Further, the video game may be executing in a single-player mode, or multi-player mode, wherein embodiments of the present invention provide for multi-player enhancements (e.g., assistance, communication, game slice generation, etc.) to both modes of operation. In either case, the cloud game network is configured to generate one or more renderings of a scene of a video game through artificial intelligence (AI), and to the generation of narration for the scene and/or the renderings of the scene of the video game through AI. More specifically, the cloud game network of system 10 may be configured for building one or more AI models used for generating the one or more renderings of the scene as captured through identified camera perspectives, and for generating the narration for the scene and/or the identified camera perspectives.

In some embodiments, the cloud game network 210 may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network 210 is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor 201 that provides access to a plurality of interactive video games. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5.

Client device 100 is configured for requesting access to a video game over a network 150, such as the internet, and for rendering instances of video games or gaming applications executed by the game server 205 and delivered to the display device 12 associated with a user 5. For example, user 5 may be interacting through client device 100 with an instance of a video game executing on game processor 201. Client device 100 may also include a game executing engine 111 configured for local execution of the video game, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game.

Game logic of a video game is built upon a game engine or game title processing engine. The game engine includes core functionality that may be used by the game logic to build a gaming environment of the video game. For example, some functionalities of a game engine may include a physics engine for simulating physical forces and collisions on objects in the gaming environment, a rendering engine for 2D or 3D graphics, collision detection, sound, animation, artificial intelligence, networking, streaming, etc. In that manner, the game logic does not have to build from scratch the core functionalities provided by the game engine. Either local to the client or at the cloud gaming server, the game logic in combination with the game engine is executed by a CPU and GPU, wherein the CPU and GPU may be configured within an accelerated processing unit (APU). That is, the CPU and GPU along with shared memory may be configured as a rendering pipeline for generating the game rendered video frames, such that the rendering pipeline outputs game rendered images as video or image frames that are suitable for display, including corresponding color information for each of the pixels in a targeted and/or virtualized display.

Network 150 may include one or more generations of network topologies. As newer topologies come online, increased bandwidth is provided to handle ever greater resolutions of rendered images and/or media. For instance, 5G networks (fifth generation) providing broadband access through digital cellular network will replace the 4G LTE mobile networks. 5G wireless devices connect to a local cell through local antennas. These antennas are then connected to the telephone network and internet by high bandwidth connections (e.g., optical fiber, etc.). It is expected that 5G networks operate at higher speeds with better quality of service. As such, higher resolution of video frames and/or media can be provided over these newer network topologies in association with video gaming.

Client device 100 is configured for receiving rendered images, and for displaying the rendered images on display 12. For example, through cloud based services the rendered images may be delivered by an instance of a video game executing on game executing engine 211 of game server 205 in association with user 5. In another example, through local game processing, the rendered images may be delivered by the local game executing engine 111 (e.g., for game play or for spectating). In either case, client device 100 is configured to interact with the executing engine 211 or 111 in association with the game play of user 5, such as through input commands that are used to drive game play.

Further, client device 100 is configured to interact with the game server 205 to capture and store metadata of the game play of user 5 when playing a video game, wherein each metadata includes information (e.g., game state, etc.) related to the game play. More particularly, game processor 201 of game server 205 is configured to generate and/or receive metadata of the game play of user 5 when playing the video game. For instance, metadata may be generated by the local game execution engine 111 on client device 100, outputted and delivered over network 150 to game processor 201. In addition, metadata may be generated by game executing engine 211 within the game processor 201, such as by an instance of the video game executing on engine 211. In addition, other game processors of game server 205 associated with other virtual machines are configured to execute instances of the video game associated with game plays of other users and to capture metadata during those game play.

As will be described below, the metadata may be used for training one or more AI models that are configured for generation of camera perspectives of a scene in a gaming session of a video game, and for AI controlled generation of narration for the scene and/or the camera perspectives of the scene, in accordance with embodiments of the present disclosure.

More particularly, the metadata also includes game state data that defines the state of the game at that point. For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at a corresponding point. The game state data may be stored in game state database 145 of datastore 140. In some embodiments, some game state data may only be stored in memory.

The metadata also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the metadata. For example, user saved data may include the game difficulty selected by the user 5 when playing the game, game level, character attributes, character location, number of lives left, the total possible number of lives available, armor, trophy, time counter values, and other asset information, etc. User saved data may also include user profile data that identifies user 5, for example. User saved data is stored in database 141 of datastore 140.

In addition, the metadata also includes random seed data that may be generated using artificial intelligence. The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. The game state data may include learning done by the AI, such as having the AI remember previous interactions with the player so that those interactions can influence future decisions made by the AI. As an illustration, these AI characters may randomly walk the streets in a city scene. In addition, other objects may be generated and presented in an overlay. For instance, clouds in the background and birds flying through space may be generated and presented in an overlay. The random seed data is stored in random seed database 143 of data store 140.

In that manner, system 10 may be used for training one or more AI models that are configured for generation of camera perspectives of a scene in a gaming session of a video game, and for AI controlled generation of narration for the scene and/or the camera perspectives of the scene. In particular, metadata collected during execution of one or more video games during gaming sessions, or during replays of gaming sessions, as well as replays of recordings of gaming sessions may be used for training the one or more AI models. For example, the cloud gaming system including game server 205 may be configured for training a statistics and facts generation model, an AI camera perspective model 321 and an AI narration model 331 using deep learning engine 190 of an AI server 260. Also, the deep learning engine may be used for identifying spectator zones-of-interest that are likely to be of interest to spectators. The identified spectator zones-of-interest are used to generate camera perspectives and narration using artificial intelligence that are likely to be watched by spectators.

As such, the cloud gaming system may be later accessed by spectators to generate in real-time rendered views (e.g., from camera perspectives) of a scene from current and/or previously played gaming sessions, and to provide narration for that scene, wherein the rendered views and narration are generated using artificial intelligence. In particular, the camera perspective engine 230 is configured to implement the AI camera perspective model 321 to generate the rendered views of the scene from a corresponding gaming session, wherein the rendered views are generated from one or more camera perspectives that are identified to be potentially of high interest to spectators. Also, the broadcaster/narrator engine 220 is configured to implement the AI narration model 331 to generate commentary and/or narration for the scenes and/or the camera perspectives of that scene, wherein the commentary is generated using templates and statistics and facts that generated using an AI stats/facts model 341 based on metadata collected during the gaming session for that scene.

Figure 1B:
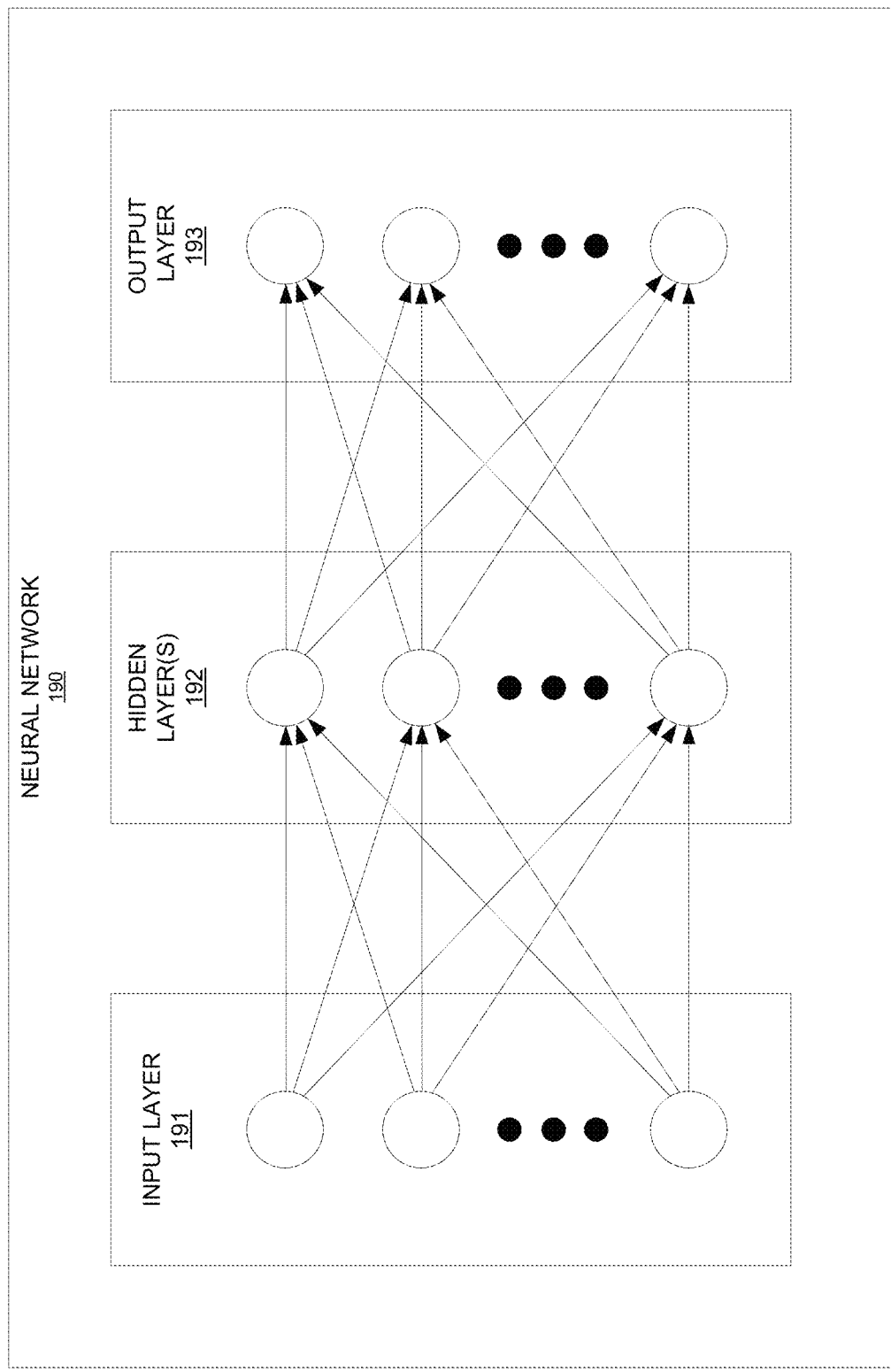
FIG. 1B illustrates an example neural network used to build an artificial intelligence (AI) model, including an AI camera perspective model and an AI narration model, in accordance with one embodiment of the present disclosure.

FIG. 1B illustrates an example neural network used to build an artificial intelligence (AI) model, including an AI camera perspective model and an AI narration model, in accordance with one embodiment of the present disclosure. In that manner, given as input one or more gaming sessions, including single-player and multi-player sessions, the AI models are configured to identify spectator zones-of-interest of scenes in those gaming sessions that are potentially of interest to spectators, wherein the AI models are configured to generate views or camera perspectives of those scenes that are likely to be of interest to the spectators, and/or to generate narration that is provided in isolation or to complement the camera views or camera perspectives of those scenes. As such, the AI models can be configured to generate rendered views (e.g., camera perspectives) of a scene in a gaming session of a video game, and to generate narration for the scene and/or the camera perspectives of the scene, wherein the rendered views and/or the narration may be streamed to spectators during or post gaming sessions.

More particularly, the AI camera perspective model and the AI narration model are trained and/or built using the deep learning engine 190, in accordance with one embodiment of the present disclosure. The neural network 190 may be implemented within an AI server 260 at a back-end server, in one embodiment. In particular, the deep learning engine 190 (e.g., using an AI modeler) is configured to learn which zones-of-interest of scenes in gaming sessions are of greatest interest to spectators, wherein a scene of a virtualized gaming environment within a gaming session may be viewed from one or more camera perspectives when training a corresponding AI model. For example, the zone-of-interest may be following an expert, or may define a David and Goliath situation where a beginner has an opportunity for a kill-shot on an expert, or may define a scenario where an expert has a victim in his or her gun-sights, etc. Also, the deep learning engine 190 may be configured to learn which views of the scenes corresponding to the identified zones-of-interest are of greatest interest to spectators when training an AI camera perspective model 321. The views may be defined through one or more camera angles taken within a gaming environment showing the scene. Further, the deep learning engine 190 may be configured to learn which statistics and facts are of interest to spectators when building a narration for the scenes corresponding to the identified zones-of-interest, wherein the narration may be provided in isolation or to complement the views of the scenes corresponding to the identified zones-of-interest when streamed to spectators. In that manner, one or more spectators are able to view the most exciting scenes of a particular gaming session that is supported with narration built to generate the most interest of spectators, wherein the views may be provided in real-time for a live gaming session, or may be generated for replays of a corresponding gaming session, wherein the replays may be streamed during the gaming session, or after the gaming session has ended.

Specifically, the deep learning or machine learning engine 190 (e.g., in cooperation with an AI modeler—not shown) is configured to analyze training data collected during one or more gaming sessions of one or more video games, during spectator views of the one or more gaming sessions, during replays of the one or more gaming sessions, during live broadcasts having live narration of the one or more gaming sessions, etc. The deep learning engine 190 during the learning and/or modeling phase utilizes artificial intelligence, including deep learning algorithms, reinforcement learning, or other artificial intelligence-based algorithms to build one or more trained AI models using the training data and success criteria (e.g., generates high interest, etc.). The trained AI models are configured to predict and/or identify zones-of-interest of corresponding scenes in gaming sessions that are of high interest to spectators, to identify views and camera perspectives that can be generated for those scenes that are of high interest to spectators, and to identify or generate statistics and facts for use in building a narration of the scenes corresponding to the identified zones-of-interest and corresponding to the identified camera perspectives. The deep learning engine 190 may be configured to continually refine the trained AI models given any updated training data. The refinements are based on determining which sets of training data can be used for training based on how those sets perform within the deep learning engine 190 based on corresponding success criteria.

Additional training data may be collected and/or analyzed from human input. For example, experts in the field providing broadcasting for professional gaming events may be utilized for providing highly valued input data (i.e., associated with high success criteria). These experts may help define what zones-of-interest should be tracked during the gaming sessions, which views and/or camera perspectives should be generated for those identified zones-of-interest, and which statistics and facts should be identified and/or generated for use in building narration of the scenes corresponding to the identified zones-of-interest and corresponding to the identified camera perspectives.

The resulting AI models of the video game can be used by the camera perspective engine 230, the broadcaster/narrator engine 220, and/or the highlights engine 240 to generate given any set of input data (e.g., gaming sessions) the most exciting scenes of a particular gaming session that is supported with narration built to generate the most interest of spectators, wherein the views may be provided in real-time for a live gaming session, or may be generated for replays of a corresponding gaming session, wherein the replays may be streamed during the gaming session, or after the gaming session has ended.

The neural network 190 represents an example of an automated analysis tool for analyzing data sets to determine spectator zones-of-interest, views and/or camera perspectives of scenes corresponding to the identified spectator zones-of-interest, and narration including statistics and facts collected or generated during the corresponding gaming session that are of high interest to one or more spectators. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning, or rewards based learning (e.g., through the use of success criteria, success metrics, etc.). For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to instances of a game play of the video game, wherein the instances include one or more features that define that instance (e.g., controller input, game state, results data, etc.). The intermediary predictions of the model are determined through a classifier that creates labels (e.g., outputs, features, nodes, classifications, etc.).

At the highest hierarchical level, an output layer 193 exists. The output layer 193 includes a set of output nodes. An output node represents a decision (e.g., zone-of-interest, camera perspective, statistics and facts for a given set of input data, etc.) that relates to one or more components of a trained AI model 160, for example. As previously described, the output nodes may identify the predicted or expected actions, or learned actions for a given set of inputs, wherein the inputs may be one or more single-player or multi-player gaming sessions of one or more video games. These results can be compared to predetermined and true results, or learned actions and results (e.g., human input driving successful results, etc.), as obtained from current and/or previous gaming sessions and/or broadcasts of those gaming sessions that are used for collecting the training data in order to refine and/or modify the parameters used by the deep learning engine 190 to iteratively determine the appropriate predicted or expected responses and/or actions for a given set of inputs. That is, the nodes in the neural network 190 learn the parameters of the trained AI models (e.g., AI camera perspective model 321, AI narration model 331, statistics and facts model 341, etc.) that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the predicted or expected responses and/or actions to be performed for a given set of inputs or input data (e.g., gaming sessions). In this illustration, the data domain includes gaming sessions data collected through multiple game plays of multiple users, spectator views of the gaming sessions, human input provided by experts selecting zones-of-interest, camera perspectives, and statistics and facts that are used to define baseline input data. In another example, the training dataset is from different data domains to include input data other than baseline. Based on these predictive results, the neural network 190 may also define the trained AI models that are used to determine those results and/or actions (e.g., the predicted zones-of-interest, camera perspectives, and statistics and facts used for building narration) to be performed given a set of inputs (e.g., gaming sessions). As such, the AI models are configured to generate given any set of input data (e.g., gaming sessions) the most exciting scenes of a particular gaming session that is supported with narration built to generate the most interest of spectators, wherein the views may be provided in real-time for a live gaming session, or may be generated for replays of a corresponding gaming session, wherein the replays may be streamed during the gaming session, or after the gaming session has ended.

Figure 2:
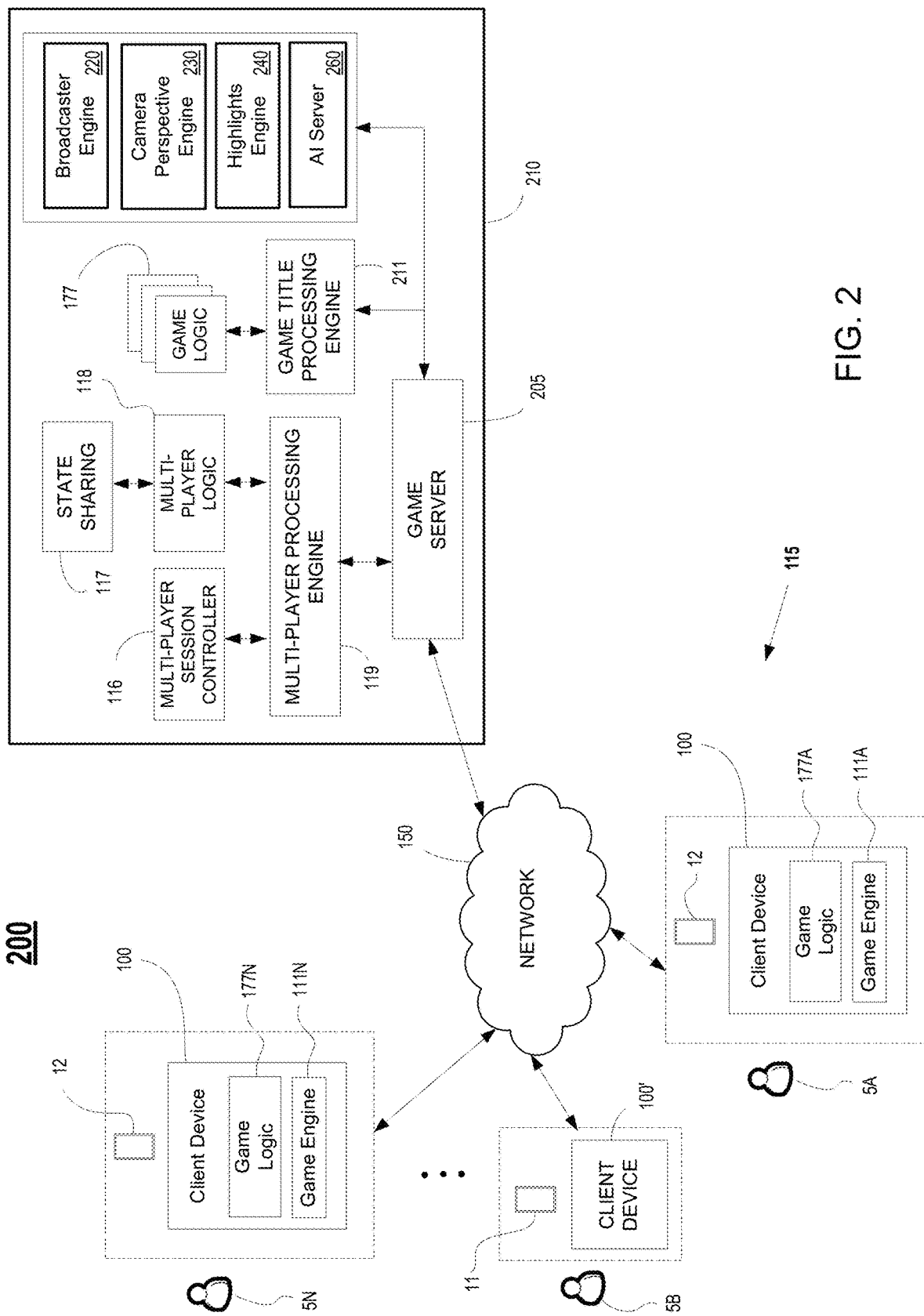
FIG. 2 illustrates a system providing gaming control to one or more users playing one or more gaming applications that are executing locally to the corresponding user or at a back-end cloud gaming server in one or more gaming sessions, wherein the gaming sessions are used for training a camera perspective model and a narration model through AI, the AI models being used to identify interesting camera perspectives of scenes of the gaming sessions and to provide narration for those scenes of those gaming sessions that most likely will be interacted with by spectators, in accordance with one embodiment of the present disclosure.

FIG. 2 illustrates a system 200 providing gaming control to one or more users playing one or more video games that are executing locally to the corresponding user or at a back-end cloud gaming server in one or more gaming sessions of one or more video games, wherein the one or more gaming sessions are used for training an AI camera perspective model and an AI narration model through artificial intelligence, wherein the AI models are used to identify camera perspectives of gaming sessions and to provide narration for the scenes of those gaming sessions that are most likely to be watched by spectators, in accordance with one embodiment of the present disclosure. In other embodiments, the AI models are used to generate rendered views of scenes of a single-player or multi-player gaming session that is accompanied by narration using AI identified statistics and facts that are then streamed to one or more spectators. In one embodiment, system 200 works in conjunction with system 10 of FIG. 1A to train and/or implement AI models configured for generating camera perspectives of gaming sessions and to provide narration for the scenes of those gaming sessions that are most likely to be watched by spectators. Referring now to the drawings, like referenced numerals designate identical or corresponding parts.

As shown in FIG. 2, a plurality of users 115 (e.g., user 5A, user 5B . . . user 5N) is playing a plurality of video games over one or more gaming sessions. Each of the gaming applications may be executed locally on a corresponding client device 100 (e.g., game console) of a corresponding user, or at a back-end cloud gaming system 210. In addition, each of the plurality of users 115 has access to a display 12 or device 11 each configured to display rendered images for a gaming session used for training, or for displaying rendered images of interesting scenes of current or previous gaming sessions built using AI models.

In particular, system 200 provides gaming control to a plurality of users 115 playing one or more video games being executed locally, in accordance with one embodiment of the present disclosure. For example, user 5A may be playing a first video game on a corresponding client device 100, wherein an instance of the first video game is executed by corresponding game logic 177A (e.g., executable code) and game title execution engine 111A. For purposes of illustration, game logic may be delivered to the corresponding client device 100 through a portable medium (e.g., flash drive, compact disk, etc.) or through a network (e.g., downloaded through the internet 150 from a gaming provider). Further, user 115N is playing an Nth video game on a corresponding client device 100, wherein an instance of the Nth video game is executed by corresponding game logic 177N and game title execution engine 111N.

In addition, system 200 provides gaming control to a plurality of users 115 playing one or more video games as executed over a cloud gaming system 210, in accordance with one embodiment of the present disclosure. Cloud gaming system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of video games to a plurality of corresponding users (e.g., players, spectators, etc.). In some embodiments, the cloud game network may be a game cloud system 210 that includes a plurality of virtual machines (VMs) running on a hypervisor of a host machine, with one or more virtual machines configured to execute a game processor utilizing the hardware resources available to the hypervisor of the host. One or more users may access the game cloud system 210 via network 150 for remote processing of video games using client devices 100 or 100', wherein client device 100' may be configured as a thin client that interfaces with a back end server providing computational functionality (e.g., including game executing engine 211). For example, user 5B is playing a second video game on a corresponding client device 100', wherein an instance of the second video game is executed by a corresponding game title execution engine 211 of the cloud gaming system 200. Game logic (e.g., executable code) implementing the second video game is executed in cooperation with the game title processing engine 211 to execute the second video game. User 5B has access to at least device 11 configured to display rendered images.

Client devices 100 or 100' may receive input from various types of input devices, such as game controllers, tablet computers, keyboards, gestures captured by video cameras, mice touch pads, etc. Client devices 100 and 100' can be any type of computing device having at least a memory and a processor module that is capable of connecting to the game server 205 over network 150. Also, client devices 100 and 100' of corresponding users are configured for generating rendered images executed by the game title execution engine 111 executing locally or remotely, and for displaying the rendered images on a display. For example, a corresponding client device 100 or 100' is configured to interact with an instance of a corresponding video game as executed locally or remotely to implement a game play of a corresponding user, such as through input commands that are used to drive game play.

In one embodiment, client device 100 is operating in a single-player mode for a corresponding user that is playing a gaming application.

In another embodiment, multiple client devices 100 are operating in a multi-player mode for corresponding users that are each playing a specific gaming application. In that case, back-end server support via the game server 205 may provide multi-player functionality, such as through the multi-player processing engine 119. In particular, multi-player processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1A, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user when playing the game, game level, character attributes, character location, number of lives left, the total possible number of lives available, armor, trophy, time counter values, etc. User saved data may also include user profile data that identifies a corresponding user. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may generate AI rendered views (e.g., camera perspectives) of a scene in a gaming session of a video game, and to generate narration for the scene and/or the camera perspectives of the scene, wherein the rendered views and/or the narration may be streamed to spectators during or post gaming sessions. In that manner, one or more spectators are able to view the most exciting scenes of a particular gaming session that is supported with narration built to generate the most interest of spectators, wherein the views may be provided in real-time for a live gaming session, or may be generated for replays of a corresponding gaming session using AI models as implemented by an AI server 260. In particular, an AI model is used to identify spectator zones-of-interest in one or more gaming sessions that potentially would be of interest to spectators. For a particular identified spectator zone-of-interest that corresponds to a scene of a gaming session for a video game, camera perspective engine uses an AI camera perspective model to generate or identify one or more camera perspectives of the scene that would be of interest to the spectators. In addition, for the particular identified spectator zone-of-interest that corresponds to the scene, broadcaster/narrator engine 220 uses an AI narration model to identify and/or generate statistics and facts based on game state data and other information related to the gaming session corresponding to the scene. The generated statistics and facts are weaved together using commentary templates to generate commentary that can be streamed in isolation or streamed with the one or more camera perspectives of the scene to one or more spectators.

Further, highlights engine 240 of the cloud gaming system 210 is configured to generate AI rendered views of current or previous gaming sessions using AI models to generate one or more rendered views (e.g., camera perspectives) of identified spectator zones-of-interest that corresponds to one or more scenes in one or more gaming sessions, and to provide narration for those scenes. A highlight reel may be generated by highlights engine 240 including the AI rendered views and AI generated narration and streamed to one or more spectators.

Figure 3A:
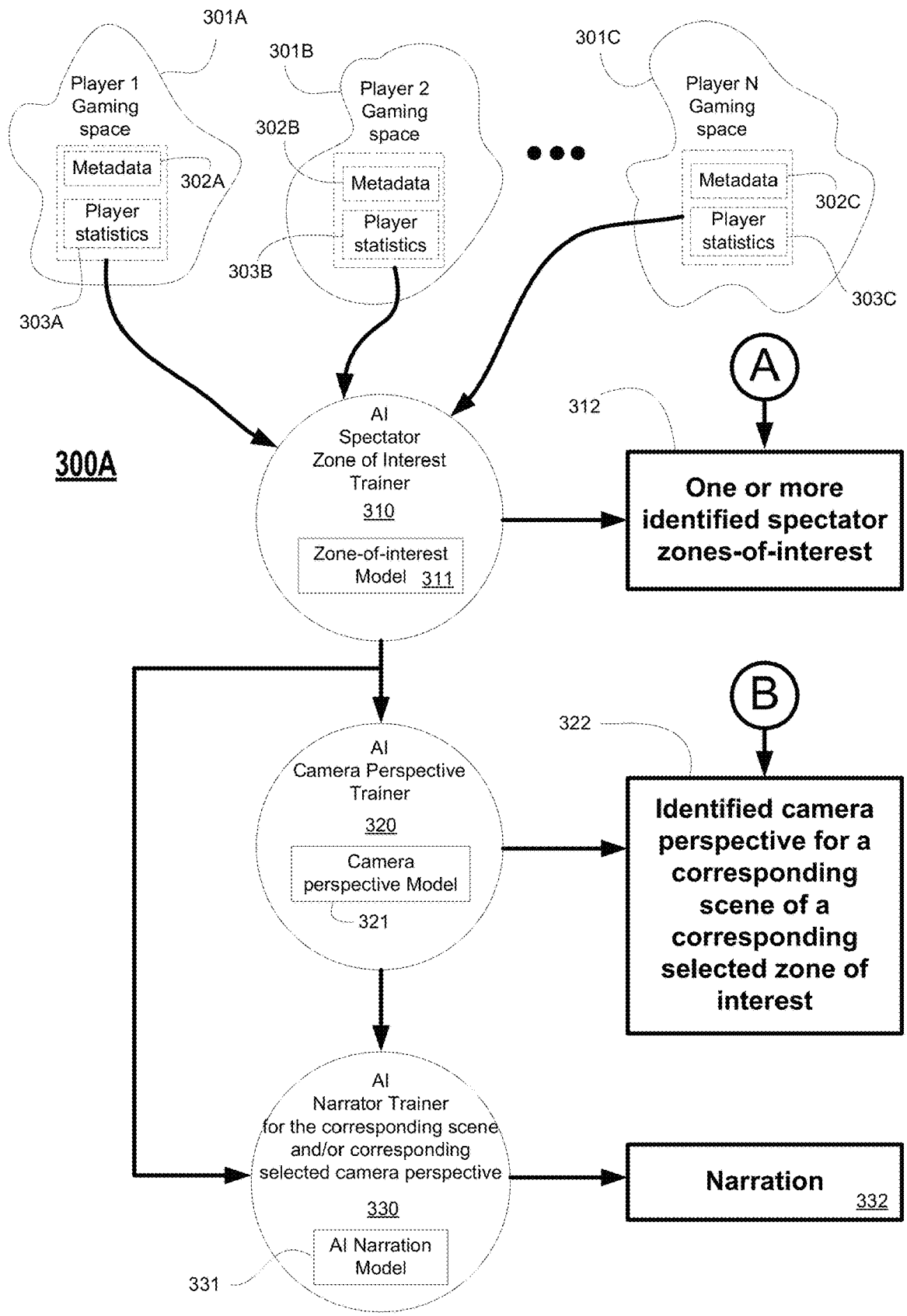
FIG. 3A illustrates a system configured to train AI models that can identify spectator zones-of-interest in a plurality of gaming session of a plurality of gaming applications, to identity interesting camera perspectives of those identified spectator zones-of-interest, and to provide narration for the scenes of those identified spectator zones-of-interest, in accordance with embodiments of the present disclosure.

FIG. 3A illustrates a system 300A configured to train one or more AI models to identify spectator zones-of-interest in a plurality of gaming sessions of a plurality of video games, to identify interesting camera perspectives of those identified spectator zones-of-interest, and to generate commentary and/or narration for the scenes of those identified spectator zones-of-interest, in accordance with embodiments of the present disclosure. System 300 is also configured to use the AI models to generate rendered views (e.g., camera perspectives) of an AI identified scene in a gaming session of a video game, and to generate narration for the scene and/or the camera perspectives of the scene, wherein the rendered views and/or the narration may be streamed to spectators during corresponding gaming sessions, or after the end of corresponding gaming sessions. In some embodiments, one or more renderings of a game are generated by artificial intelligence (AI), such as using the AI trained camera perspective model 321. In one embodiment, the AI camera perspective model 321 can control camera angles to capture the most interesting action and can cut between angles to incorporate action that does not fit into a single view and to show the action from different points of view. The AI camera perspective model 321 can pick camera angles to include a full view of suspected action, such as an angle showing both a sniper and the target that the sniper is aiming at. In another embodiment, the AI zone-of-interest model 311 can take into account many aspects of the game and of player's interests to determine what action will be of the most interest to the audience. Different streams can be generated for different spectators. In still another embodiment, AI narration model 331 can add commentary to the game streams that it produces. In another embodiment, the highlight engine can include replays of action in its streams so that spectators can see exciting actions again from different points of view, and can see actions that did not occur in a live camera view of the game.

For training, system 300A receives as input metadata, player statistics, and other information from one or more gaming sessions of one or more video games, wherein the gaming sessions may be single-player or multi-player gaming sessions. The one or more gaming sessions may be generated from one or more players playing the video games (e.g., for purposes of supervised learning), or may be generated from one or more AI players playing the video games (e.g., for unsupervised learning), or may be generated from a combination of one or more human players and/or one or more AI players. In addition, human input may be provided as training data, such as expert selection and/or definition of spectator zones-of-interest, camera perspectives, and/or statistics and facts used for narration. For example, gaming space 301A of player 1 is associated with a gaming session of a corresponding video game, wherein metadata 302A and player statistics 303A are provided as input to the AI spectator zone-of-interest trainer 310 to train a spectator zone-of-interest model 311 using artificial intelligence. Similar data is collected and provided as input from gaming space 301B of player 2 and on up to gaming space 301N of player N. As such, given a set of inputs (e.g., one or more gaming sessions), the spectator zone-of-interest model 311 is trained to output one or more identified spectator zones-of-interest 312 that are potentially of high interest to one or more spectators. A more detailed discussion of the training and implementation of the AI spectator zone-of-interest trainer 310 and zone-of-interest model 311 is provided in FIG. 3B.

Each of the identified spectator zones-of-interest is associated with a corresponding scene of a video game executing for a gaming session. Different camera perspectives may be generated for the game (e.g., for the players), or newly generated using game state data using artificial intelligence. One advantage of generating the rendering of a new camera angle at a later point in time is that a particular action can be identified to be shown in a replay, and then the camera angle to best show that action can be calculated, and then the rendering of the action from that camera angle can be generated. This allows for a replay of the action from a camera angle that is more advantageous than any camera angle that was identified while the action was happening (e.g., initially generated by the game). The newly identified and generated camera angle can then be shown in the replay. For example, this can be useful when implemented to show events that led up to an action of interest (e.g., during a replay), when those events initially did not seem interesting, i.e., those event occurred before it was known that they would lead to an interesting action (e.g., the action of interest). In general, AI camera perspective trainer 320 is configured to receive as input one or more camera perspectives for the identified spectator zones-of-interest output from the zone-of-interest model 311. Based on success criteria, the AI camera perspective trainer is configured to train the camera perspective model 321 to output at least one identified view or camera perspective 322 for a corresponding scene of a corresponding selected and/or identified spectator zone-of-interest, wherein the camera perspective is of high interest to one or more spectators. A more detailed discussion of the training and implementation of the AI camera perspective trainer 320 and camera perspective model 321 is provided in FIG. 3C.

In addition, for each scene of a corresponding identified spectator zones-of-interest a commentary can be built using artificial intelligence. In particular, AI broadcaster/narrator trainer 330 receives as input one or more statistics and facts from the corresponding gaming session. Based on success criteria, the AI broadcaster/narrator trainer 330 is configured to train the narration model 331 to identify statistics and facts that are of high interest to spectators and to weave those identified statistics and facts into a commentary and/or narration 332, such as using commentary templates. A more detailed discussion of the training and implementation of the AI broadcaster/narrator trainer 330 and narration model 331 is provided in FIG. 3D.

Figure 3B:
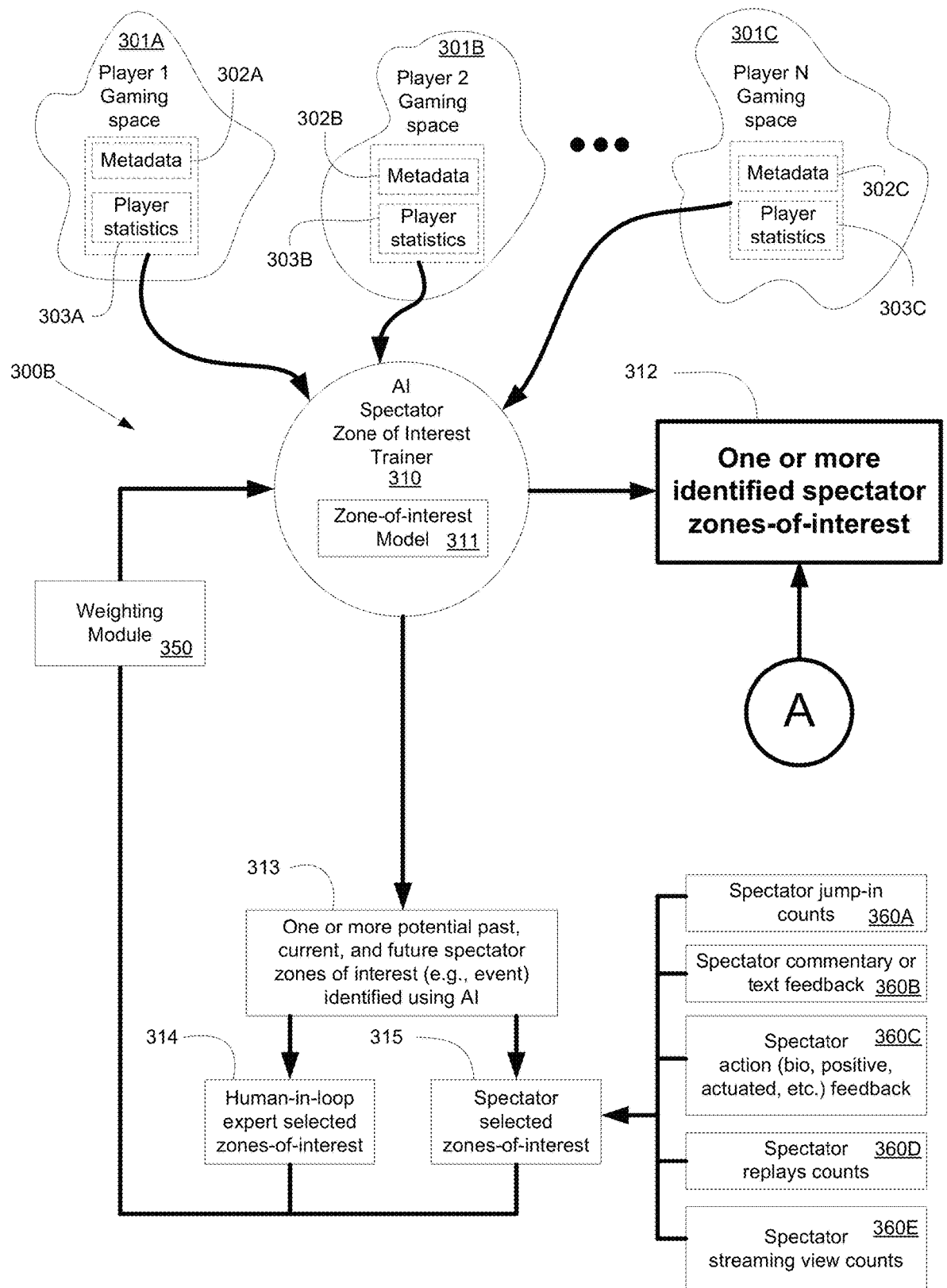
FIG. 3B illustrates a system used for training through AI a spectator zone-of-interest model used to identify spectator zones-of-interest that are potentially interesting to spectators, in accordance with one embodiment of the present disclosure.

FIG. 3B illustrates a system 300B used for training using artificial intelligence a spectator zone-of-interest model 311 used to identify spectator zones-of-interest that are potentially interesting to spectators, in accordance with one embodiment of the present disclosure. System 300B may be implemented within the cloud gaming system 210, and more specifically within the AI server 260 of cloud gaming system 210.

For training, system 300B receives as input metadata, player statistics, and other information from one or more gaming sessions of one or more video games, wherein the gaming sessions may be single-player or multi-player gaming sessions. The one or more gaming sessions may be generated from one or more players playing the video games (e.g., for purposes of supervised learning), or may be generated from one or more AI players playing the video games (e.g., for unsupervised learning), or may be generated from a combination of one or more human players and/or one or more AI players. For example, gaming space 301A of player 1 is associated with a gaming session of a corresponding video game, wherein metadata 302A and player statistics 303A are provided as input to the AI spectator zone-of-interest trainer 310 to train a spectator zone-of-interest model 311 using artificial intelligence. Further, gaming space 301B of player 2 is associated with a gaming session of a corresponding video game, wherein metadata 302B and player statistics 303B are provided as input to the AI spectator zone-of-interest trainer 310 to train a spectator zone-of-interest model 311. Additional input data is provided. For example, gaming space 301N of player N is associated with a gaming session of a corresponding video game, wherein metadata 302N and player statistics 303N are provided as input to the AI spectator zone-of-interest trainer 310 to train a spectator zone-of-interest model 311. In addition, human input may be provided as training data, such as expert selection and/or definition of spectator zones-of-interest, camera perspectives, and/or statistics and facts used for narration.

As previously described, metadata is collected during corresponding gaming sessions used for training, and may include game state, and other user information. For example, game state data defines the state of the game at a point used to generate a gaming environment of the video game, and may include game characters, game objects, game object attributes, game attributes, game object state, graphic overlays, etc. Game state may include the state of every device used for rendering the game play (e.g., CPU, GPU, memory, etc.). Game state may also include random seed data generated using artificial intelligence, for example. Game state may also include user saved data, such as data used to personalize the video game. For example, user saved data may personalize a character for a particular user so that the video game is rendered with a character that may be unique to that user (e.g., shape, look, clothing, weaponry, etc.). User saved data may include user defined game difficulty, game level, character attributes, character location, number of lives left, asset information, etc. User saved data may include user profile data.

Also, player statistics may include user (e.g., player 1) profile information, or other collected statistics that apply generally to player 1, such as player name, games played, types of games played, level of expertise, etc. Player statistics may also include or be based on user profile data.

As previously described, zone-of-interest trainer 310 implements deep learning engine 190 to analyze using artificial intelligence training data collected during one or more gaming sessions of one or more video games, during spectator views of the one or more gaming sessions, during replays of the one or more gaming sessions, during live broadcasts having live narration of the one or more gaming sessions, human input, etc. to identify spectator zones-of-interest that are of high interest to spectators. In particular, the deep learning engine 190 during the learning and/or modeling phase utilizes artificial intelligence, including deep learning algorithms, reinforcement learning, or other artificial intelligence-based algorithms to build the zone-of-interest model 311 using the training data and success criteria.

For example, a feedback loop may be provided to train the zone-of-interest model 311. In particular, with each iteration the feedback loop may help to refine the success criteria used by the zone-of-interest trainer 310 when outputting one or more identified spectator zones-of-interest 312. As shown, the AI spectator zone-of-interest trainer 310 through the zone-of-interest model 311 being trained may provide as output one or more potential zones-of-interest for a given set of inputs. The inputs may be associated with one or more gaming sessions of one or more video games. For ease of illustration, the feedback process is described in relation to a set of inputs being provided from one gaming session, such as a single-player or multi-player gaming session. In addition, the gaming session may be live, or may have already occurred. In that manner, historical game data corresponding to previous gaming sessions may be used to train the zone-of-interest model 311 to better predict how to follow the action in the gaming session and select what is of interest to spectators.

In particular, the output 313 being provided may include past, current, and future spectator zones-of-interest for the gaming session provided as a set of inputs. Current zones-of-interest provided as output 313 may provide for real-time tracking of interesting zones-of-interest in an ongoing gaming session, or in a gaming session that has ended but is being replayed using recorded game state data. Past zones-of-interest provided as output 313 may assess previous game play in a gaming session that is currently ongoing, or for a gaming session that has ended. Future zones-of-interest provided as output 313 may assess interesting scenarios in the gaming session (live or one that has ended) that potentially may occur, such that the zone-of-interest model 311 may be configured to follow the action in the gaming session that is live or being replayed using game state data.

Characterizations of zones-of-interest may be defined (e.g., by game state data or statistics in the gaming session) to help identify what is of interest to one or more spectators. For example, a zone-of-interest may be defined by a certain event, situation, or scenario, etc. (e.g., David and Goliath, underdog, reaching a goal, beating a level, etc.). In another example, a zone-of-interest may be defined by a scene within a video game, such as an important scene that is pivotal within a game (e.g., reaching the culmination of a task that enables a character to evolve into a higher state). In still another example, a zone-of-interest may be defined by a section or segment of a video game, such as reaching a particular geographic area and/or region of a gaming world, or when reaching a boss level where a character is about to engage with a boss, etc. In still another example, a zone-of-interest may be defined by a particular action of interest, such as when a character is about to scale a mountain in the video game to reach a target, etc. In another example, a zone-of-interest may be defined by a schadenfreude cluster, such that one or spectators may enjoy watching the downfall of a player. Still other definitions are supported in embodiments of the disclosure.

In another example, a zone-of-interest may be defined by the relationship between two players in the gaming session. In one case, two expert players (e.g., professionals) may be within a geographic distance of each other in the gaming world of the video game, wherein there is a high likelihood that they will meet, such as in a head-to-head matchup. In another case, there may be a low-level player set up take out an expert player with a kill-shot (e.g., David and Goliath or underdog scenario), wherein the low-level player only has once chance before the expert takes out the low-level player. In another case, the low-level player is within the gun sights of an expert (e.g., having a high snipe rate). In another example, a zone-of-interest may be defined by the player, wherein a player popular among one or more spectators may be tracked in a zone-of-interest. In still another example, the player may have a particular characteristic that compels spectators to watch, such as having a high snipe rate indicating that this player seeks out sniping scenarios that spectators may be tuned to watch. The zone-of-interest may include timing characteristics, wherein the player with a high snipe rate may have a target within his or her gun sights. The zone-of-interest may include geographic characteristics, wherein the player with a high snipe rate may be within a certain area of the gaming world, wherein that area may be rich in targets. Still other definitions are supported in embodiments of the disclosure.

In another example, a zone-of-interest may be characterized by predicted actions or results of players. For instance, a zone-of-interest may be defined as an area or region of the gaming world for the video game that has a high rate of level-ups, or that has a high rate of deaths of characters (e.g., performing a difficult task, or that requires traversing difficult terrain, etc.). In other instances, a zone-of-interest may be defined as a game condition (perform a tasks) that has a low rate of success, or that has a high rate of success. Still other definitions are supported in embodiments of the disclosure.

In other examples, preferences can be given for following popular players, which defines a zone-of-interest. Also, preference can also be given for following players that are more likely to be eliminated, such as following players in an area with many other players nearby rather than following players that are hiding with no other players nearby. Which players to follow can be determined partially, or fully, from which feeds are the most popular with the spectators that are watching the game. Spectators can vote directly, or can vote indirectly by directly selecting feeds to view or players to follow.

The zones-of-interest provided as output 311 during training may be further filtered and fed back to the AI spectator zone-of-interest trainer 310 to help define success criteria. For example, zones-of-interest may be selected either through a human in the loop, or through other spectator active and/or passive metrics.

In particular, spectator viewing choices influences which zones-of-interest are selected using the AI model. For example, each of the zones-of-interest provided as output 313 may correspond to portions of a gaming session that is viewable by one or more spectators through selection. That selection may help to define success criteria for favorable zones-of-interest defined as being interesting to spectators. In some cases, a spectator may actively selecting to view a gaming session that is live from one or more live gaming session choices, or through a replay of a gaming session selectable from one or more replay choices. In some implementations a spectator can set up criteria for what replays will be shown to them, either automatically, or presented as choices they can select to view. In some cases, the spectator may choose to reinforce what is defined by the AI zone-of-interest model 311 by choosing to view a stream of replays that is controlled by humans and/or artificial intelligence choosing to view a stream of replays that is controlled by AI selection and generation.

Examples of actions 360 by spectators that help define which zones-of-interest is favorable to spectators, such as the defined spectator selected zones-of-interest 315 that is provided as positive feedback to the AI spectator zone-of-interest trainer 310 is provided below, and is intended to be illustrative, and not intended to be exhaustive. For example, a spectator jump-in counts 360A that exceed a threshold indicate that that zone-of-interest is favorable to spectators. Also, positive spectator feedback 360B provided as commentary or text feedback during a viewing of the portion of the gaming session including the corresponding spectator zone-of-interest may help define a corresponding zone-of-interest that is favorable to spectators, especially when there is a lot of positive feedback. Further, active or passive spectator actions 360C during a viewing of the portion of the gaming session including the corresponding spectator zone-of-interest may help define a corresponding zone-of-interest that is favorable to spectators. For example, passive actions may include bio-feedback (e.g., sweating, smiling, etc.). In another example, active actions may include selection of icons indicating a positive interest in the viewing of the gaming session, etc. Spectators can vote directly, or can vote indirectly by directly selecting feeds to view or players to follow. For example, spectator replay counts 360D indicating how popular a replay of a portion of the gaming session including the corresponding spectator zone-of-interest may help define a corresponding zone-of-interest that is favorable to spectators. The zone-of-interest that spectators choose to follow can be used as an indicator of how interesting a zone-of-interest is. For example, when spectators switch to following the zone-of-interest that is following a particular player, it can be used as an indicator that the zone-of-interest is of interest to spectators. In some cases, spectators are allowed to choose their own camera angle or angles to view. The chosen camera angles can be used as an indicator of places where action of interest is occurring, which can be used in determining a zone-of-interest or a particular camera angle. In another example, spectator streaming view counts 360E of live gaming sessions indicating how popular a replay of a portion of the gaming session including the corresponding spectator zone-of-interest may help define a corresponding zone-of-interest that is favorable to spectators. Still other definitions of providing spectator feedback are supported in embodiments of the disclosure.

Spectators may also be given the ability to simply select a reaction such as Applause, Boo, Yawn, etc. These could be aggregated and displayed to players in a tournament, as well as being collected, to determine a level of spectator attention to a zone-of-interest or action. In some cases, spectators are able to give such feedback associated to the overall action, a particular action, the activity of a non-player-character, or the activity of a particular player. This information can be useful in determining what action players want to see, which can be useful in picking the action to show during a patch or in designing game matches to increase the likelihood of situations that users prefer occurring during the match. In some cases, spectators are able to give feedback about how well they think the broadcast of game play is being done, which may be associated with particular choices of actions or replays to show, camera angles chosen, the information included in the narration, the wording of the narration, the appearance of rendered narrators, or speech characteristics of the narration rendering. Spectator feedback can be used in aggregation by the AI to generate broadcasts that better appeal to a wide audience. Spectator feedback by a particular spectator can be used by the AI to generate broadcasts specifically for that spectator that are a better fit for what that particular spectator enjoys.

Other input may also be provided related to the gaming session, and/or user. For example, human input 314 may be provided that may inherently have high valuation or define high success criteria when used for training. For example, a human expert may be used to help identify spectator zones-of-interest from one or more gaming sessions as viewed by the expert, and provided as feedback to the AI spectator zone-of-interest trainer 310. In one use case, a gaming session may be live streamed with an expert viewing the live stream. In another use case, an expert may be viewing a gaming session that may be recorded, or replayed using game state. In either case, the expert is able to actively select and/or define favorable zones of interest that by definition have or translate to a high success criteria when used for training. In some implementations, AI will generate multiple renderings from camera angles in one or more zone-of-interests, which will be presented to a human expert as choices that can be selected to be included in broadcasts. The human expert may also be presented with renderings from human controlled camera angles also available for selection. In some cases, the human expert may give feedback to the AI to affect the camera angles of the renderings presented by the AI, such as to zoom-in or zoom-out, or pan to show a different angle.

In one embodiment, a weighting module 350 provides a weight to the feedback provided as human-in-loop selected zones-of-interest 314 and spectator selected zones of interest 315.

Once trained, the AI zone-of-interest model 311 is able to identify one or more spectator zones-of-interest for a given input. For example, when providing a gaming session (e.g., single player or multi-player), the AI zone-of-interest model 311 provides as an output one or more identified zones-of-interest 312 within that gaming session. Additional actions may be taken, as indicated by bubble—A, and as further described in FIG. 3C.

Figure 3C:
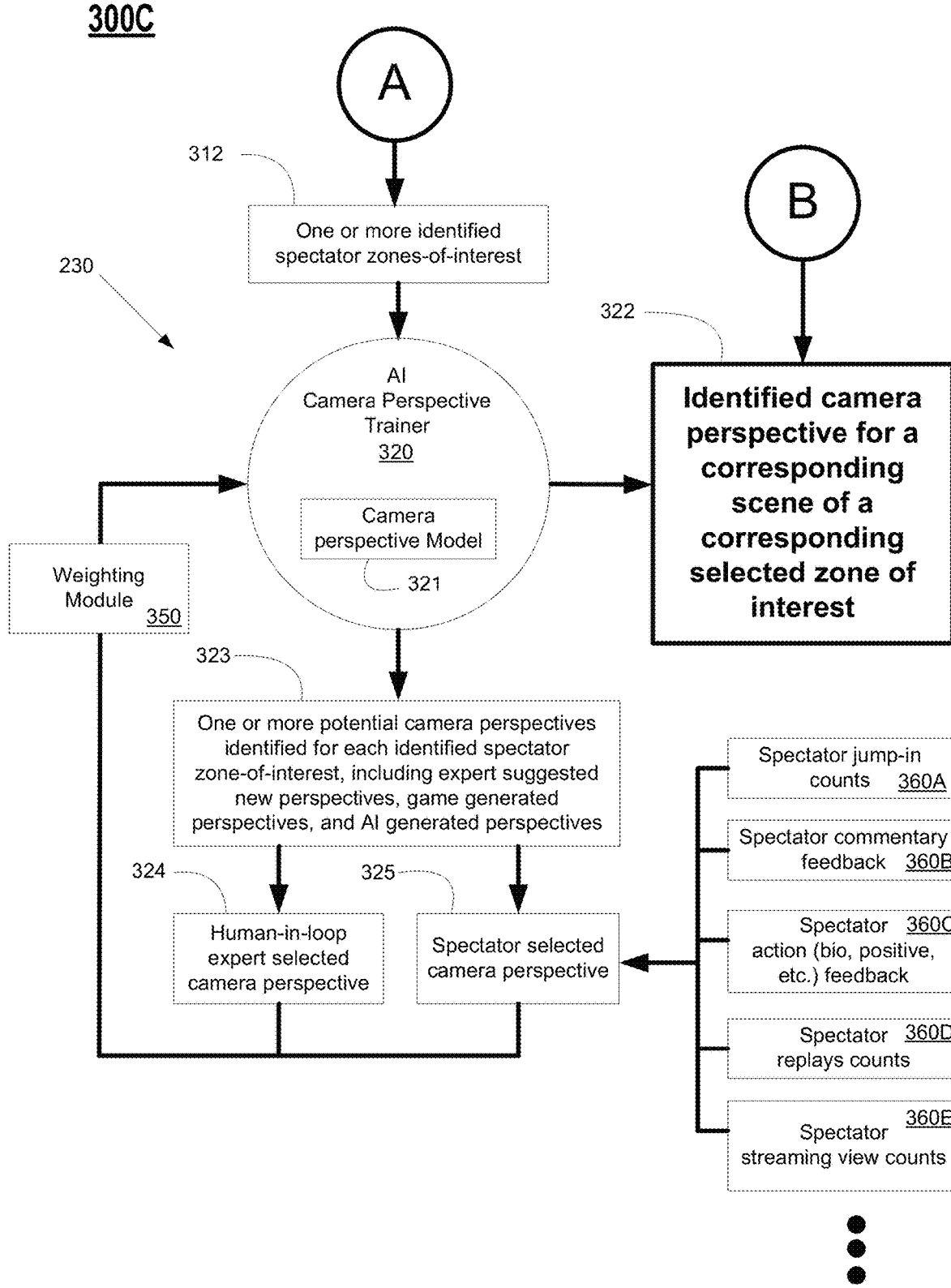
FIG. 3C illustrates a system for training through AI camera perspective model that can be configured to identify camera perspectives of scenes for zones-of-interest previously identified by the zone-of-interest AI model as being interesting to spectators, wherein the identified camera perspectives are also identified as being interesting to the spectators, in accordance with one embodiment of the present disclosure.

FIG. 3C illustrates a system 300C for training through AI camera perspective model that can be configured to identify camera perspectives of scenes for zones-of-interest previously identified by the zone-of-interest AI model as being interesting to spectators, wherein the identified camera perspectives are also identified as being interesting to the spectators, in accordance with one embodiment of the present disclosure. System 300C may be implemented within the camera perspective engine 230 of cloud gaming system 210, and more specifically within the camera perspective engine 230 utilizing AI server 260 of cloud gaming system 210.

In some implementations, one or more renderings of a game are generated by artificial intelligence (AI), such as using the AI trained camera perspective model 321. In one embodiment, the AI camera perspective model 321 can control camera angles to capture the most interesting action and can cut between angles to incorporate action that does not fit into a single view and to show the action from different points of view. Different streams having different camera perspectives can be generated for different spectators. The AI camera perspective model 321 can pick camera angles to include a full view of suspected action, such as an angle showing both a sniper and the target that the sniper is aiming at.

For training, system 300C receives as input the one or more identified spectator zones-of-interest 312 that are of high interest value to one or more spectators. In particular, the AI camera perspective trainer 320 receives as input the one or more identified spectator zones-of-interest 312. In addition, other input data may be provided, such as the metadata 302, player statistics 303, and other information from one or more gaming session of one or more video games that was previously provided to the AI spectator zone-of-interest trainer 310, wherein the gaming sessions may be single-player or multi-player gaming sessions.

As previously described, AI camera perspective trainer 320 implements deep learning engine 190 to analyze using training data collected during one or more gaming sessions of one or more video games performed by human players and/or AI players, during spectator views of the one or more gaming sessions, during replays of the one or more gaming sessions, during live broadcasts having live narration or commentary of the gaming sessions, human input, etc. to identify camera perspectives corresponding to rendered views of a scene of identified zones-of-interest. In particular, the deep learning engine 190 during the learning and/or modeling phase utilizes artificial intelligence, including deep learning algorithms, reinforcement learning, or other artificial intelligence-based algorithms to build the camera perspective model 321 using the training data and success criteria.

For example, a feedback loop may be provided to train the camera perspective model 321. In particular, with each iteration the feedback loop may help to refine the success criteria used by the camera perspective trainer 320 when outputting at least one camera perspective 322 for a corresponding scene of a corresponding selected zone-of-interest.

As shown, the AI camera perspective trainer 320 through the camera perspective model 321 being trained may provide as output 323 one or more potential camera perspectives for a given set of inputs. The inputs may be associated with one or more gaming sessions of one or more video games performed by human players and/or AI players. For ease of illustration, the feedback process is described in relation to a set of inputs being provided from one gaming session, such as a single-player or multi-player gaming session. In addition, the gaming session may be live, or may have already occurred. In that manner, historical game data corresponding to previous gaming sessions may be used to train the camera perspective model 321 to better predict how to follow the action in the gaming session and select what is of interest (e.g., camera perspectives for viewing) to spectators.

As previously described, the one or more identified spectator zones-of-interest may be associated with gaming sessions that are live, or recorded, or being replayed using game state data. The AI camera perspective trainer 320 is configured to generate one or more camera perspectives for each of the identified zones-of-interest. These camera perspectives provided as output 323 may be game generated, such as by taking video generated for a player in the gaming session. Some camera perspectives provided as output 323 may be newly generated by the video game within the gaming sessions, wherein the new camera perspectives may be AI generated, or may be suggested by a human-in-the loop expert (e.g., professional broadcaster). For example, a new camera perspective may include a close-up view of a target character that is within the gun-sights of another player.

The camera perspectives provided as output 323 during training may be further filtered and fed back to the AI camera perspective trainer 320 to help define success criteria. For example, camera perspectives may be selected from the output 323 either through a human-in-loop or through spectator active and/or passive metrics.

As previously described, spectator viewing choices influences which camera perspectives may be selected through filtering. For example, each of the camera perspectives provided as output 323 may correspond to portions of a gaming session that is viewable by one or more spectators through selection. That selection may help to define success criteria for favorable camera perspectives defined as being interesting to spectators. For example, the spectator may actively select a viewing of a live gaming session or recorded gaming session, or replay of gaming session (e.g., using game state) as selected from one or more viewing choices (of one or more gaming sessions), as previously described. For example, FIG. 4 illustrates a user interface 400 configured for selecting a camera perspective and a zone-of-interest of a gaming session of a gaming application, wherein the user interface 400 includes one or more spectator zones-of-interest 312 identified by the zone-of-interest AI model 311 as being interesting to spectators, and one or more generated camera perspectives 323 for those identified spectator zones-of-interest 312, the camera perspectives being identified using an AI camera perspective model 321 as being interesting to spectators, in accordance with one embodiment of the present disclosure. As such, a spectator may choose a spectator zone-of-interest (312-1, 312-2, or 312-3) of a gaming session, wherein each zone-of-interest may focus on a different part of a corresponding gaming world (e.g., follow player 1 in one zone of interest, follow player 2 in another zone-of-interest, etc.). Once the zone-of-interest is chosen, the spectator may select a corresponding camera perspective. For example, spectator may choose one of camera perspectives 323-1A, 323-1B, or 323-1C for spectator zone-of-interest 312-1. Also, the spectator may choose one of camera perspectives 323-2A, 323-2B, or 323-2C for spectator zone-of-interest 312-2. Further, the spectator may choose one of camera perspectives 323-3A, 323-3B, or 323-3C for spectator zone-of-interest 312-3. In some implementations, a spectator may control a camera perspective to create a custom camera perspective that was not presented to them as a predefined choice. In some cases, another spectator may also view the custom camera perspective controlled by the spectator.

The same actions 360 that were previously described in relation to FIG. 3B can be used for defining spectator selected camera perspectives 325 through filtering. For example, actions 360 may include spectator jump-in counts 360A, positive spectator feedback 360B provided as commentary or text feedback, active or passive spectator actions 360C, spectator replay counts 360D, spectator streaming view counts 360E, and other spectator feedback that are determined during viewings of selected camera perspectives that were provided as output 323 may help define corresponding camera perspectives that are favorable to spectators.

Other input may also be provided related to the gaming session, and/or user. For example, human input 324 may be provided that may inherently have high valuation or define high success criteria when used for training. For example, a human expert may be used to help identify camera perspectives from one or more gaming sessions as viewed by the expert, and provided as feedback to the AI spectator camera perspectives trainer 320. That is, the camera positions having corresponding perspectives may be selectable by the human expert. In one use case, a gaming session may be live streamed with an expert viewing the live stream. In another use case, an expert may be viewing a gaming session that may be recorded, or replayed using game state. In either case, the expert is able to actively select and/or define favorable camera perspectives that by definition have or translate to a high success criteria when used for training. For example, the previously described user interface 400 may be used to select by the human expert one or more camera perspectives for a corresponding identified zones-of-interest. The user interface 400 includes one or more spectator zones-of-interest 312 identified by the zone-of-interest AI model 311 as being interesting to spectators, and one or more generated camera perspectives 323 for those identified spectator zones-of-interest 312, as identified using an AI camera perspective model 321 as being interesting to spectators.

In one embodiment, a weighting module 350 provides a weight to the feedback provided as human-in-loop selected camera perspectives 324 and spectator selected camera perspectives 325.

Once trained, the AI camera perspective 321 is able to identify one or more spectator camera perspectives for a given input. For example, when providing a gaming session (e.g., single player or multi-player), the AI camera perspective model 321 provides as an output one or more identified camera perspectives 322 for a corresponding scene of a corresponding selected zone-of-interest within that gaming session. A zone-of-interest within a gaming application may correspond to a scene generated by the video game within a gaming world, wherein the scene may be viewable through one or more rendered views taken from different camera perspectives within that gaming world. For example, multiple renderings of views may be generated by the AI camera perspective model 321, which can be fixed camera positions within a gaming world, and/or camera positions with corresponding perspectives that follow individual players or teams, and/or camera positions with corresponding perspectives that are controlled by AI to follow various aspects of the action. As an example, an identified camera perspective 322 within a gaming world may be taken from a point of view of an enemy in the gaming session. This will allow a spectator to view a player from the point of view of an enemy (another player or game generated) that the viewed player is fighting. Additional actions may be taken, as indicated by bubble—B, and as further described in FIG. 3D.

Figure 3D:
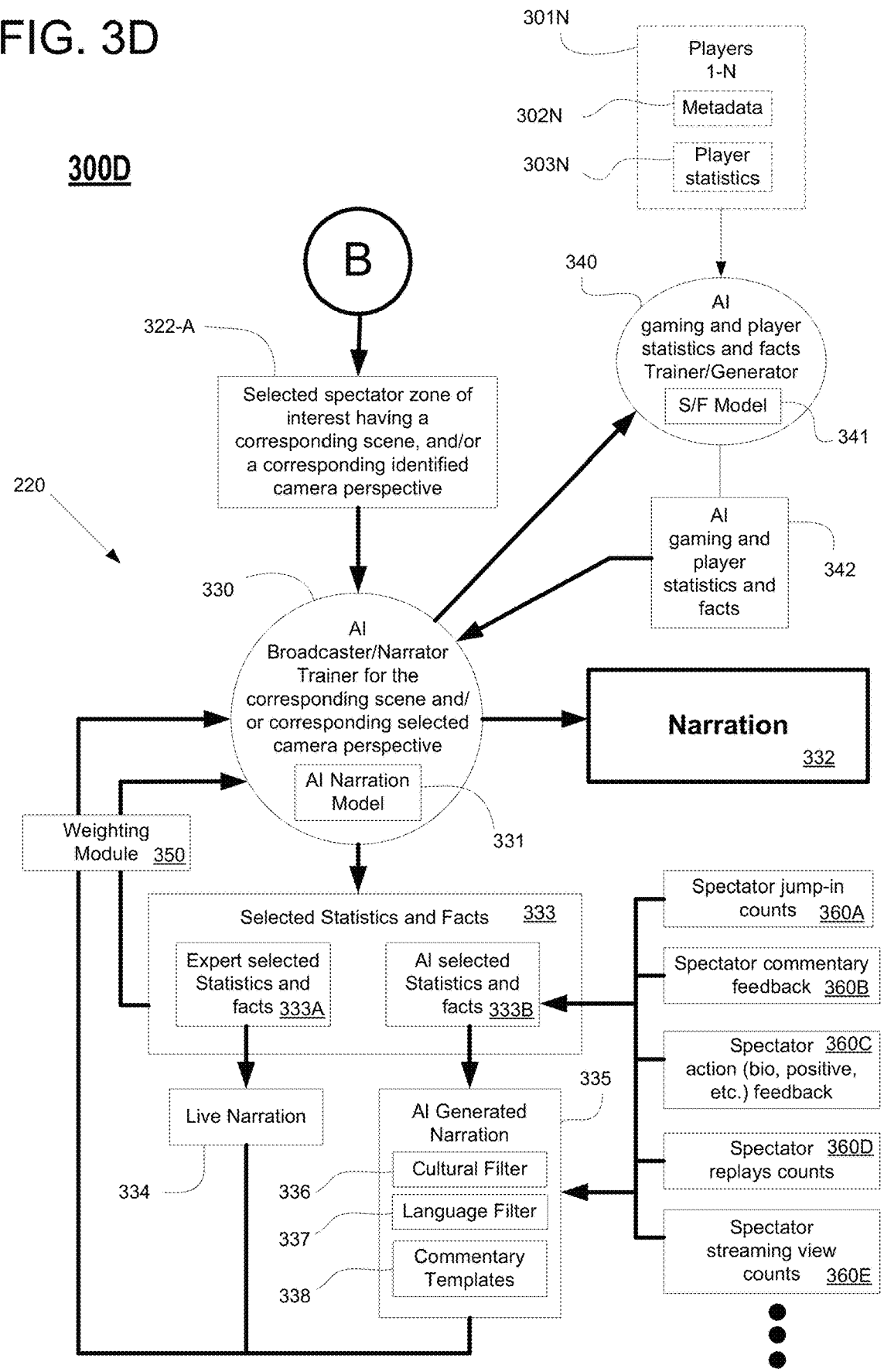
FIG. 3D illustrates a system for training using AI a broadcasting/narration model that can be configured to generate narration for the scenes of the zones-of-interest previously identified by the zone-of-interest AI model as being interesting to spectators, wherein the narration may be tailored to the camera perspectives identified by the AI camera perspective model, in accordance with one embodiment of the present disclosure.

FIG. 3D illustrates a system 300D for training using AI a narration model 331 that can be configured to generate commentary and/or narration for the scenes of the zones-of-interest previously identified by the zone-of-interest AI model 311 as being interesting to spectators, wherein the commentary may be tailored to the camera perspectives identified by the AI camera perspective model, 321 in accordance with one embodiment of the present disclosure. System 300D may be implemented within the broadcaster/narrator engine 220 of cloud gaming system 210, and more specifically within the broadcaster/narrator engine 220 utilizing AI server 260 of cloud gaming system 210.

In some implementations, narration is generated for a scene of an identified zone-of-interest previously identified through artificial intelligence as being interesting to one or more spectators. The narration is generated using statistics and facts that are generated and/or identified using artificial intelligence based on metadata and player statistics collected and/or generated for corresponding gaming sessions performed by human players and/or AI players. That is, the AI narration model 331 can add commentary to the scenes of a corresponding selected zone-of-interest, wherein the commentary and/or camera perspectives of the scene may be streamed to one or more users. In that manner, the most exciting scenes of a particular gaming session that is supported with narration built to generate the most interest of spectators may be streamed to one or more spectators, wherein the views may be provided in real-time for a live gaming session, or may be generated for replays of a corresponding gaming session, wherein the replays may be streamed during the gaming session, or after the gaming session has ended.

For training, system 300D receives as input the one or more identified camera perspectives for corresponding scenes of corresponding selected zones-of-interest. In particular, the AI broadcaster/narrator trainer 330 receives as input the one or more identified camera perspectives 322. For purposes of illustration, system 300D may be trained using a particular camera perspective 322-A selected through AI and associated with a corresponding scene of an identified or selected spectator zone-of-interest using AI.

In addition, the AI broadcaster/narrator trainer 330 may also receive the one or more identified spectator zones-of-interest 312 that are of high interest value to one or more spectators in isolation, or with the one or more identified camera perspectives 322. That is, commentary and/or narration may be generated based on the scene of an identified zone-of-interest, such that the commentary is streamed in audio without any video, or the commentary is streamed as a complement to the video.

In addition, other input data may be provided to the AI broadcaster/narrator trainer 330, such as gaming and player statistics and facts 342 generated through artificial intelligence. In one implementation, the gaming and player statistics and facts 342 is unfiltered, wherein the AI narration model 331 is trained to filter the statistics and facts 342 to identify statistics and facts that are of high interest to one or more spectators using artificial intelligence. For example, metadata 302, player statistics 303, and other information from one or more gaming session of one or more video games that was previously provided to the AI spectator zone-of-interest trainer 310 may also be provided to the AI statistics and facts trainer 340. In that manner, the statistics and facts trainer 340 implements deep learning engine 190 to analyze the training data collected during one or more gaming sessions to identify statistics and facts about those gaming sessions using artificial intelligence. In particular, deep learning engine 190 may utilize artificial intelligence, such as deep learning algorithms, reinforcement learning, etc. to build the statistics/facts model 341 used to identify and/or generate statistics and facts of corresponding gaming sessions.

For example, a feedback loop may be provided to train the AI narration model 331. In particular, with each iteration the feedback loop may help to refine the success criteria used by the AI broadcaster/narrator trainer 330 when outputting one or more selected and/or identified statistics and facts 333. As shown, the AI broadcaster/narrator trainer 330 through the statistics/facts model 331 being trained may provide as output one or more statistics and facts 333 for a given set of inputs (e.g., the identified scene and/or camera perspectives of that scene). The inputs may be associated with one or more gaming sessions. For ease of illustration, the feedback process is described in relation to a set of inputs being provided from one gaming session (e.g., live, recorded, replayed using game state). In that manner, historical game data corresponding to previous gaming sessions may be used to train the AI narration model 331 to better predict how to follow the action in the gaming session and select what is of interest (e.g., statistics and facts) to spectators to be used when building a corresponding narration.

As shown, the AI broadcaster/narrator trainer is configured to select statistics and facts 333 from the set of statistics and facts 342 that were generated and/or identified using the statistics/facts model 341 for the gaming session using artificial intelligence. In particular, an AI broadcaster/narrator trainer 330 is configured to identify statistics and facts that are of high interest to one or more spectators using artificial intelligence. In that manner, AI broadcaster/narrator trainer 330 implements deep learning engine 190 to analyze the training data collected during one or more gaming sessions, during spectator views of live or recorded or replayed gaming sessions, live narration of gaming sessions, human input to identify statistics and facts that are of high interest to spectators. In particular, deep learning engine 190 may utilize artificial intelligence, such as deep learning algorithms, reinforcement learning, etc. to build the AI narration model 331. In that manner, given a set of inputs (e.g., a selected spectator zone-of-interest having a corresponding scene and/or a corresponding camera perspective), the AI narration model 331 is configured to output gaming and player statistics and facts provided as output 331 that are high interest to one or more spectators, which can then be used for raining or to build a narration 332.

The selected statistics and facts provided as output 333 may be further filtered and provided as feedback to help define success criteria. For example, statistics and facts may be selected from output 333 either through a human-in-loop or through spectator active and/or passive metrics. That is, filtering may define expert selected statistics and facts 333A and AI selected statistics and facts 333B that is reinforced through spectator action.

As previously described, spectator viewing choices influences which camera perspectives may be selected through filtering. For example, the statistics and facts provided as output 333 may correspond to portions of a gaming session that is viewable by one or more spectators through selection. That selection may help to define success criteria for favorable statistics and facts defined as being interesting to spectators. For example, the spectator may actively select a viewing of a live gaming session or recorded gaming session, or replay of gaming session (e.g., using game state) as selected from one or more viewing choices (of one or more gaming sessions), as previously described. The selected views also correspond to unique statistics and facts that may help define the AI selected statistics and facts 333B. In addition, actions by spectators (e.g., jump-in counts 360A, positive spectator feedback 360B, active or passive spectator actions 360C, replay counts 360D, streaming view counts 360E, etc.) can be used for defining statistics and facts 333B as selected through artificial intelligence. For example, statistics and facts associated with portions of a gaming session that is viewable by one or more spectators through selection may be defined as being of high interest to spectators as the viewed gaming sessions are also identified as being of high interest to spectators.

Other input may also be provided related to the gaming session, and/or user. For example, human input may be provided that may inherently have high valuation or define high success criteria when used for training. For example, a human expert may be used to help identify statistics and facts 333A from one or more gaming sessions as viewed by the expert, and provided as feedback to the AI broadcaster/narrator trainer 330. That is, certain statistics and facts provided as output 333 may be selectable by the human expert viewing a corresponding gaming session that may be live streamed, or recorded gaming session, or replayed gaming session using game state. In that manner, the expert is able to actively select and/or define favorable statistics and facts that by definition have or translate to a high success criteria when used for training.

In one embodiment, a weighting module 350 provides a weight to the feedback provided as human-in-loop selected statistics and facts 333A and AI generated and spectator reinforced statistics and facts 333B.

In one embodiment, the filtered statistics and facts used for building the AI narration model 331 may be sent to the AI gaming and player statistics and facts trainer 340. In that manner, the trained statistics/facts model 341 may also be configured to identify statistics and facts that are of high interest to one or more spectators. In that manner, instead of outputting all the statistics and facts for a particular gaming session, the statistics/facts model 341 is configured to filter those statistics and facts to output only statistics and facts that are of high interest to spectators, in one embodiment.

In one embodiment, the expert selected statistics and facts 33A are collected from live narration 334 that is provided by the expert. That is, the live narration 334 includes the expert selected statistics and facts 333A, which can be parsed in one implementation, or provided through active selection by the expert in another implementation. The live narration may also be provided to the broadcaster/narrator trainer 330 as feedback, to help identify types of narration (e.g., used to build templates) with corresponding expert selected facts that are of high interest to one or more spectators, wherein the feedback can be used to build templates used for generating narration.

In another embodiment, the AI selected statistics and facts 333B is used to build AI generated narration 335. For example, the narration 335 may be built using commentary templates 338 what weave in the AI selected statistics and facts 333B. The spectator actions 360 may be used to help select which commentary templates are the most interesting for spectators. Each of the templates may reflect a particular style that is preferred by one or more spectators, such as a template that is personal to one spectator, or a template that is has a style for a group of spectators, etc.

In another embodiment, the AI generated narration 335 may be further filtered by culture and/or language, as well as other filters. For example, the narration 335 generated through artificial intelligence may be formatted for a particular language using the language filter 337. In that manner, a single scene and/or camera perspective of the scene may be supported through one or more narrations 335 formatted into one or more languages. Further, the narration 335 may be further filtered for cultural characteristics (e.g., sensitivities, preferences, likes, etc.) using a cultural filter 336. The cultural characteristics may be defined for a particular geographic region (e.g., country, state, border, etc.). For example, different cultural characteristics may describe a scene in different ways, such as ignoring an object or associated topic of the scene for one cultural characteristic, or addressing the object or associated topic head-on in another cultural characteristic. Some cultural characteristics may prefer to have excitable commentary, whereas other cultural characteristics may prefer more subdued commentary. In that manner, AI generated narration and/or commentary 335 may be generated using an appropriate template 338 that is further customized to a culture, and to a language. In some embodiments, the AI generated narration and/or commentary 335 may be even more personalized to a particular spectator or group of spectators, wherein the cultural filter 336 is designed to apply filtering particular to the spectator, or to a group of spectators. In that manner, the AI narration model 331 is configured to produce one or more streams that are localized to viewers in multiple locations, including commentary in different languages that takes into account cultural and gender considerations.

In one embodiment, a weighting module 350 provides a weight to the feedback provided as human-in-loop live narration 334 and the AI generated narration 335. In some embodiments, a broadcast includes narration by both one or more human narrators and one or more AI narrators. An AI narrator may incorporate what was said by a human narrator when determining what to say. In some cases, an AI narrator in a broadcast of an event may incorporate what was said by a human narrator in a separate broadcast of the same event when determining what to say. In some implementations, an AI narrator may incorporate what was said by one or more narrators and/or one or more spectators when determining what to say, where the incorporated sayings are not included in a broadcast. The sayings may be accessed through the broadcast system, or through other channels, such as social media. In some cases, the sayings may be non-verbal, such as emojis, likes, shares, or favorites.

Once trained, the AI narration model 331 is configured to build a narration 332 using AI selected statistics and facts for a given input. For example, when providing a gaming session (e.g., single player or multi-player) along with its corresponding data (e.g., metadata, player statistics, etc.), the AI narration model 331 provides as an output a narration 332 that may be further filtered for language and/or cultural characteristics (applying to one or more spectators). That is, the AI narration model 331 may include or have access to a cultural filter 336, language filter 337, and commentary templates 338.

In some embodiments, the AI generated commentary and/or narration 332 has a compelling personality. For example, the AI narration model may be configured to select statistics and facts that can communicate to the spectator why the view streamed to the spectator is significant. This may be implemented through selection of the appropriate commentary template 338. For example, the AI generated commentary and/or narration 332 may provide notification that a new or low-level player is in a position to kill an experienced player (a particular zone-of-interest). In that manner, a notification may be provided to the spectator in an effort to entice the spectator to view the scene to see if the new player can actually take advantage of the situation to kill the more experienced player.

In other embodiments, an AI voice-over may be provided as the narration and/or commentary 332. The voice-over may explain the action of an eSports game so that it will be understandable and exciting for a visually impaired spectator, in one embodiment. In another embodiment, the voice-over is provided as a play-by-play commentary to an event that may stand-alone, or be provided with views of the event.

Figure 5:
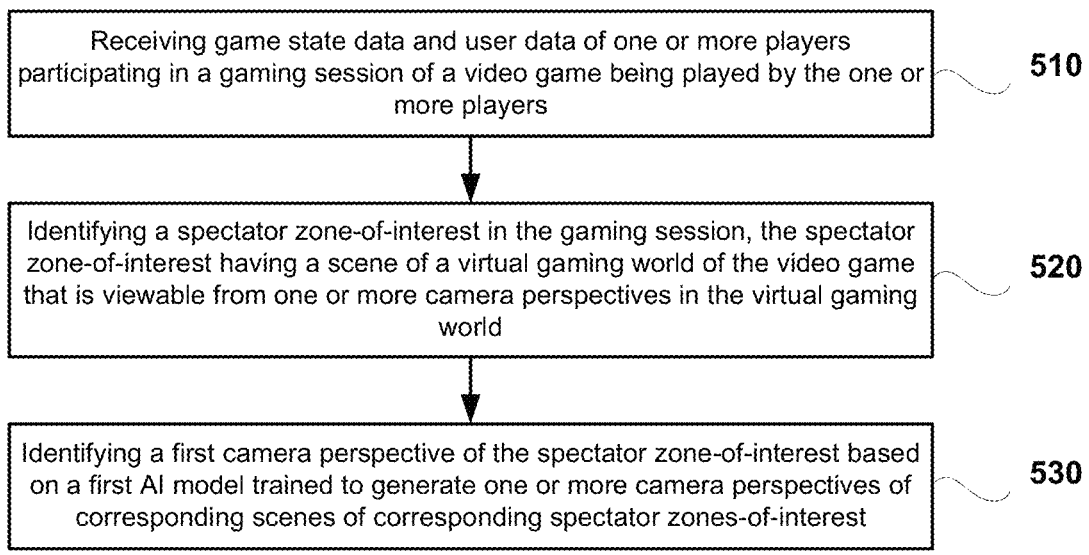
FIG. 5 is a flow diagram illustrating steps in a method for identifying a camera perspective of a spectator zone-of-interest that is potentially of interest to spectators using one or more AI models, in accordance with one embodiment of the present disclosure.

With the detailed description of the various modules of the gaming server and client device communicating over a network, a method for identifying a camera perspective of a spectator zone-of-interest that are potentially of interest to spectators using one or more AI models is now described in relation to flow diagram 500 of FIG. 5, in accordance with one embodiment of the present disclosure. In particular, flow diagram 500 illustrates the process and data flow of operations involved at a back-end AI server for generating one or more renderings of a game through artificial intelligence, wherein the renderings may be streamed to one or more spectators. For example, the method of flow diagram 500 may be performed at least in part by the camera perspective engine 230 at the could gaming server 210 of FIGS. 1A, 2, 3A and 3C.

At 510, the method includes receiving game state data and user data of one or more players participating in a gaming session of a video game. The gaming session may be a single-player or multi-player session. Metadata including, in part, game state and user data is received at the cloud gaming server in association with the gaming session. User data may be received for the one or more players participating in the gaming session. For example, game state data may define the state of the game play at a corresponding point in the game play (e.g., game state data includes game characters, game objects, object attributes, graphic overlays, assets of a character, skill set of the character, history of task accomplishments within the gaming application for the character, current geographic location of the character in the in-game environment, current status of the game play of the character, etc.). Game state may allow for generation of the in-game environment (e.g., virtual gaming world) that existed at the corresponding point in the game play. User saved data may be used to personalize the gaming application for a corresponding user (e.g., a player), wherein the data may include information to personalize the character (e.g., shape, look, clothing, weaponry, game difficulty, game level, character attributes, etc.) in the game play. Other information may include random seed data that may be relevant to the game state, as previously described.

At 520, the method includes identifying a spectator zone-of-interest in the gaming session. The spectator zone-of-interest is associated with a scene of a virtual gaming world of the video game. For instance, the scene may include the virtual gaming world at a specific location, or within a general vicinity of a character, wherein the scene is viewable from one or more camera perspectives in the virtual gaming world. For example, camera perspectives may include a view from a character's perspective, a view from another player, a top-down view of the scene, a close-up view of an object or area of the scene, a gun-sight view, etc.

In one embodiment, the spectator zone-of-interest may be identified through artificial intelligence. In particular, the more spectator zone-of-interest may be identified using an AI model (e.g., zone-of-interest model 311) trained to isolate one or more spectator zones-of-interest that are likely to be viewed by one or more spectators, as previously described. For example, a zone-of-interest may indicate when a popular player has entered the gaming session, or when two expert players are within a geographical distance of each other in the gaming world and have a high probability of meeting, etc. Each identified zone-of-interest is associated with a corresponding scene of a virtual gaming world in the gaming session. In one embodiment, a first spectator zone-of-interest may have a highest rating for potential spectator interest, and may be associated with a first scene (e.g., following the most popular professional player). Within the scene, one or more camera perspectives may be generated, such as a view from one player, or a view from a second player, a top-down view, a close-up view, a gun-sight view, etc.

In another embodiment, the spectator zone-of-interest may be identified through spectator input. For example, a spectator may actively choose a zone-of-interest to watch. As an illustration, the selected zone-of-interest may include game action for a particular player in the gaming session. As another illustration, the selected zone-of-interest may include game actions of one or more players interacting with a particular portion of the virtual gaming world. Each selected and identified zone-of-interest is associated with a corresponding scene of a virtual gaming world in the gaming session. Within the scene, one or more camera perspectives may be generated, such as a view from one player, or a view from a second player, a top-down view, a close-up view, a gun-sight view, etc.

At 530, the method includes identifying a first camera perspective of the spectator zone-of-interest. The first camera perspective is identified using an AI model (e.g., camera perspective model 321) that is trained to generate one or more camera perspectives of corresponding spectator zones-of-interest. The first camera perspective may be determined to have the highest potential interest (e.g., highest rating) to the one or more spectators. For example, the first camera perspective may show a view from a player that is an expert, wherein the expert has a target within his or her gun sights. In that manner, the first camera perspective may be identified and streamed over a network to one or more spectators, with the streamed content including a view (e.g., camera perspective) that is determined to be of high interest to one or more spectators through artificial intelligence.

In one embodiment, the stream may include one or more camera perspectives of the scene. For example, the scene may revolve around a player that is an expert who has a target within his or her gun sights. The stream may show different camera perspectives of the scene, such as one perspective from the view of the expert player, and another view from the perspective of the target player (e.g., unknowingly a target), and still another view including a close-up view of the target through a gun-sight. For example, a second camera perspective may be identified and generated for the scene based on the AI model trained to generate one or more camera perspectives of corresponding spectator zones-of-interest. The second camera perspective may be already game generated (e.g., for a current game play of a player in the gaming session), or may be newly generated using game state and has not been previously generated by the executing video game (e.g., a gun-sight camera perspective, or top-down perspective showing both players). In that manner, the streamed content may include varying views of the same scene.

In another embodiment, the first and second camera perspectives are generated for different streams. For example, the first camera perspective may be generated for a first stream that is sent over a network to a first group of one or more spectators. In one use case, the first camera perspective may be following a first professional player, and wherein the first group of spectators wishes to follow the first professional player in a first stream. The second camera perspective may be following a second professional player, wherein the second group of spectators may wish to follow the second professional player in a second stream. Both streams may be delivered over a network simultaneously to provide varying views of the same scene to different groups of spectators.

In one embodiment, the first camera perspective is identified for purposes of streaming highlights of the gaming session, wherein the gaming session may be live with highlights showing during the gaming session, or wherein the gaming session may have ended and is being viewed through a recording, or being replayed using game state. The highlights may include interesting scenes (e.g., scenes of events) as identified by zones-of-interest of previous game play occurring during the gaming session. The camera perspective may have been previously generated by the video game, such as for a player in the gaming session, or may be newly generated through artificial intelligence from a viewpoint that is identified as being highly interesting to one or more spectators.

In one embodiment, narration for the scene is generated based on an AI model (e.g., AI broadcasting/narration model 331) that is trained to build narration for corresponding scenes of corresponding spectator zones-of-interest using statistics and facts pertinent to those zones-of-interest (e.g., following the most popular professional player). The statistics and facts may be selected through artificial intelligence, and used to build the narration and/or commentary, as is described more fully below in relation to FIG. 6.

Figure 6:
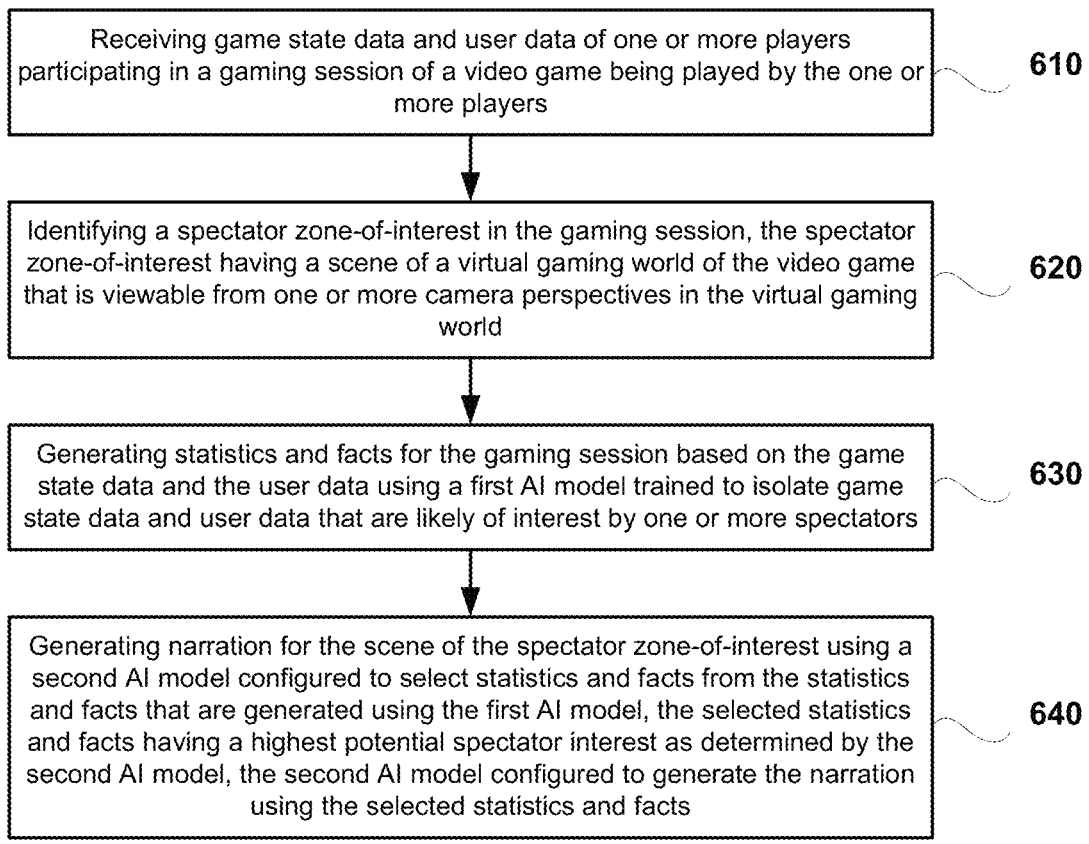
FIG. 6 is a flow diagram illustrating steps in a method for building and/or generating narration for a scene of a spectator zone-of-interest that is identified as being interesting to spectators using AI models, wherein the narration may be tailored to one or more camera perspectives of the scene also identified using an AI model, in accordance with one embodiment of the present disclosure.

With the detailed description of the various modules of the gaming server and client device communicating over a network, a method for building and/or generating narration for a scene of a spectator zone-of-interest that is identified as being interesting to spectators using one or more AI models, wherein the narration may be tailored to one or more camera perspectives of the scene identified through artificial intelligence is now described in relation to flow diagram 600 of FIG. 6, in accordance with one embodiment of the present disclosure. In particular, flow diagram 600 illustrates the process and data flow of operations involved at a back-end AI server for generating one or more renderings of a game through artificial intelligence, wherein the renderings may be streamed to one or more spectators. For example, the method of flow diagram 600 may be performed at least in part by the broadcaster/narrator engine 220 at the could gaming server 210 of FIGS. 1A, 2, 3A and 3D.

At 610, the method includes receiving game state data and user data of one or more players participating in a gaming session of a video game being played by the one or more players participating in a single-player or multi-player session. As previously described, metadata including, in part, game state and user data is received at the cloud gaming server in association with the gaming session. User data may be received for the one or more players participating in the gaming session. For example, game state data may define the state of the game play at a corresponding point in the game play (e.g., game state data includes game characters, game objects, object attributes, graphic overlays, assets of a character, skill set of the character, history of task accomplishments within the gaming application for the character, current geographic location of the character in the in-game environment, current status of the game play of the character, etc.). Game state may allow for generation of the in-game environment (e.g., virtual gaming world) that existed at the corresponding point in the game play. User saved data may be used to personalize the gaming application for a corresponding user (e.g., a player), wherein the data may include information to personalize the character (e.g., shape, look, clothing, weaponry, game difficulty, game level, character attributes, music, background sound, etc.) in the game play. Other information may include random seed data that may be relevant to the game state, as previously described.

At 620, the method includes identifying a spectator zone-of-interest in the gaming session. The spectator zone-of-interest is associated with a scene of a virtual gaming world of the video game. For instance, the scene may include the virtual gaming world at a specific location, or within a general vicinity of a character, wherein the scene is viewable from one or more camera perspectives in the virtual gaming world. For example, camera perspectives may include a view from a character's perspective, a view from another player, a top-down view of the scene, a close-up view of an object or area of the scene, a gun-sight view, etc.

In one embodiment, the spectator zone-of-interest may be identified through artificial intelligence. In particular, the spectator zone-of-interest may be identified using an AI model (e.g., zone-of-interest model 311) trained to isolate one or more spectator zones-of-interest that are likely to be viewed by one or more spectators. For example, a zone-of-interest may indicate when a popular player has entered the gaming session, or when two expert players are within a geographical distance of each other in the gaming world and have a high probability of meeting, or identify a region within the virtual gaming world that sees a lot of action (e.g., player fails, character mishaps, character deaths, etc.) etc. Each identified zone-of-interest is associated with a corresponding scene of a virtual gaming world in the gaming session. Within the scene, one or more camera perspectives may be generated, such as a view from one player, or a view from a second player, a top-down view, a close-up view, a gun-sight view, etc. For example, the first spectator zone-of-interest may be associated with a first scene of the virtual gaming world.

In another embodiment, the spectator zone-of-interest may be identified through spectator input. For example, a spectator may actively choose a zone-of-interest to watch. As an illustration, the selected zone-of-interest may include game action for a particular player in the gaming session. As another illustration, the selected zone-of-interest may include game actions of one or more players interacting with a particular portion of the virtual gaming world. Each selected and identified zone-of-interest is associated with a corresponding scene of a virtual gaming world in the gaming session. Within the scene, one or more camera perspectives may be generated, such as a view from one player, or a view from a second player, a top-down view, a close-up view, a gun-sight view, etc. In addition, the spectator may wish to have an accompanying narration (e.g., broadcast) included within a view of the selected zone-of-interest, wherein the narration may be generated using artificial intelligence, as is described more fully below.

At 630, the method includes generating statistics and facts for the gaming session based on the game state data and the user data using an AI model (e.g., statistics/facts model 341 and/or the AI narration model 331) that is trained to isolate game state data and user data that are likely of interest by one or more spectators. The isolated game state data and user data may be translated to or used to generate statistics and facts through artificial intelligence. In particular, the statistics and facts are pertinent to the corresponding identified zone-of-interest, the scene associated with that zone-of-interest, and possibly to the one or more identified camera perspectives of that scene. In addition, the AI model is configured to identify facts and statistics that are of high interest to one or more spectators, as determined through artificial intelligence.

At 640, the method includes generating narration for the scene of the spectator zone-of-interest using another AI model (e.g., AI narration model 331) that is trained to select statistics and facts previously identified for the scene. In another implementation, the AI model trained to select statistics and facts performs no filtering, as the previously identified AI model trained to isolate game state data and user data that are likely of interest by one or more spectators may also be trained to generate statistics and facts that are likely of interest by one or more spectators using artificial intelligence. In one implementation, the AI model trained to select statistics and facts further filters the statistics and facts used for narration. That is, the AI model is trained to select statistics and facts from the statistics and facts that are generated using the AI model trained to isolate game state data and user data that are likely of interest by one or more spectators, wherein the selected statistics and facts have a highest potential spectator interest as determined by the AI model trained to select statistics and facts.

In addition, the AI model trained to select statistics and facts is configured to generate the narration and/or commentary using the selected statistics and facts. In one embodiment, the narration is generated using an appropriate template for the scene. The template may be based on a video game type for the video game, or a zone-of-interest type for the first spectator zone-of-interest (i.e., the zone-of-interest defines a particular scene or scenario that corresponds with a particular template). In some embodiments, the template takes into consideration the targeted or requesting group of spectators viewing the scene with AI generated narration. For example, the template may consider a style of commentary that is preferred by the group of spectators (e.g., excitable or calm, etc.).

In other embodiments, further filtering is performed on the narration. For example, the narration may be filtered with consideration to cultural customs for the targeted group of spectators. For example, depending on the group, and the geographic region associated with the group, there may be cultural preferences that dictate how the narration is built, as previously described. For instance, one group would not have a problem including narration for a topic of the scene, whereas another group would object to having that topic included in the narration. In some embodiments, the filtering may apply a communication format filter, wherein the communication format may be a spoken language, unspoken language (sign language), etc. For example, the filtering may apply a language filter, such that the narration is generated for a particular language preferred by the group of spectators. In some embodiments, when applying filters for an unspoken language, the filtered customs should reflect the correct expressions that take into account gender, sign language variant, geographical location, etc.

In one embodiment, the same scene may be streamed to different groups of spectators taking into account one or more filters. For example, a first narration for the scene may be generated that is tailored to one or more first customs of a first group of spectators and/or a first geographic region, wherein the first narration is generated in a first language preferred by the first group. In addition, a second narration for the same scene may be generated that is tailored to one or more second customs of a second group of spectators and/or a second geographic region, wherein the second narration is generated in a second language preferred by the second group.

In one embodiment, the narration may be tailored to the corresponding camera perspective that is also streamed to the group of spectators. In that manner, the narration may closely follow the rendered view that may also be streamed. For example, the narration may move from a first perspective of the scene that is taken from the view of a first player, and then the narration may shift in content to revolve around a second perspective of the scene that is being streamed to the group of spectators. As such, there is a good connection between the streamed camera perspectives of the scene and the AI generated narration.

In one embodiment, the narration is generated for purposes of streaming highlights of the gaming session, wherein the gaming session may be live with highlights showing during the gaming session, or wherein the gaming session may have ended and is being viewed through a recording, or being replayed using game state. The highlights may include interesting scenes (e.g., scenes of events) as identified by zones-of-interest of previous game play occurring during the gaming session. The camera perspective may have been previously generated by the video game, such as for a player in the gaming session, or may be newly generated through artificial intelligence from a viewpoint that is identified as being highly interesting to one or more spectators. In addition, the narration is built for the streaming highlights, and may be tailored to the scene and the camera perspectives being streamed for the scene, wherein the narration includes statistics and facts that are identified as being of high interest to one or more spectators through artificial intelligence. In that manner, even lowly trafficked gaming sessions may have highlights that include AI narration including interesting statistics and facts as generated and identified using artificial intelligence.

Figure 7:
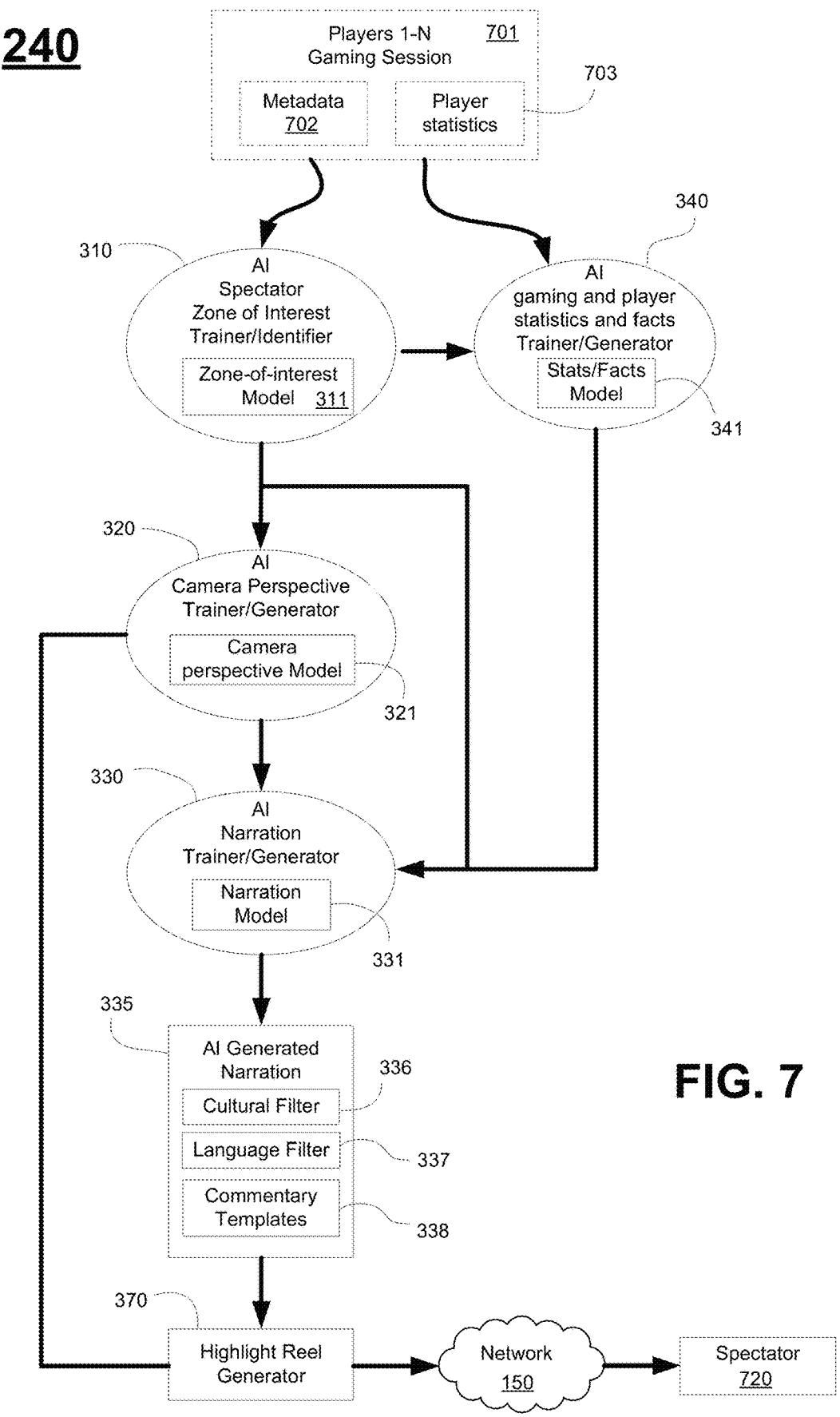
FIG. 7 illustrates the generation of a highlight reel of a gaming session including one or more players playing a gaming application, wherein the highlight reel is generated using AI models that can identify spectator zones-of-interest in a plurality of gaming session of a plurality of gaming applications, to identify interesting camera perspectives of those identified spectator zones-of-interest, and to provide narration for the scenes of those identified spectator zones-of-interest, in accordance with embodiments of the present disclosure.

FIG. 7 illustrates the generation of a highlight reel of a gaming session including one or more players playing a gaming application, wherein the highlight reel is generated using AI models that can identify spectator zones-of-interest in a plurality of gaming session of a plurality of gaming applications, to identify interesting camera perspectives of those identified spectator zones-of-interest, and to provide narration for the scenes of those identified spectator zones-of-interest, in accordance with embodiments of the present disclosure. The process flow shown in FIG. 7 may be implemented in part by the highlight engine 240.

In particular, the highlight reel may be generated for a gaming session that is live (e.g., providing highlights during the gaming session), or for a gaming session that has ended, wherein the highlight reel may be generated from a recording of the gaming session or from a replay of the gaming session using game state.

As such, highlight coverage may be available after a gaming session has ended. Such coverage through highlights can be automatically generated based on AI choices, as previously described. For example, highlight coverage including zones-of-interest, camera perspectives, and statistics and facts may be based on what spectators choose to watch or rewind when watching the gaming session. For example, highlight coverage may include near-misses where none of the players in the gaming session are eliminated, but is very exciting to view for spectators.

In addition, the highlight coverage may include replays of scenes that were not shown live, or of camera perspectives of a corresponding scene that may not have been generated during the gaming session. For example, the highlight coverage may show interesting eliminations of players in a multi-player gaming session that were not shown live. Or the highlight coverage may show a camera perspective that may be very popular with spectators, but was not generated during the gaming session. For example, in an elimination of a player that was shown live, a new top-down camera perspective may be newly generated showing a view of the shooing player and the eliminated player together in one view.

In one embodiment, the highlight coverage of a gaming session may last longer than the match itself, wherein the gaming session is for a match (e.g., head-to-head, last player standing, etc.). In some implementations, highlight coverage of eliminations earlier in the match or gaming session may continue after the end of the gaming session. For example, in situations where the status of gaming session is not available in real time, the coverage of the gaming session can be extended to show each elimination, which may extend the live broadcast of the gaming session beyond the corresponding match duration.

As shown in FIG. 7, metadata 702 and player statistics for players 1-N in a gaming session is delivered to the AI spectator zone-of-interest trainer 310 which is now configured to apply the zone-of-interest model 311. For example, the trainer 310 may be implemented as or within AI server 260. The zone-of-interest model 311 is configured to generate and/or identify one or more spectator zones-of-interest that are of high interest to one or more spectators. For example, a zone-of-interest may follow a highly popular professional player, such that one or spectators may wish to stream views of the professional player during a gaming session, or when viewing highlights.

The identified zones-of-interest may be provided as input to the AI camera perspective trainer 320 which is now configured to apply the camera perspective model 321. For example, the trainer 320 may be implemented as or within AI server 260. The camera perspective model 321 is configured to generate one or more camera perspectives for a corresponding zone-of-interest. The camera perspectives may have been generated by the video game during the gaming session, or may be newly generated to capture interesting rendered views not shown previously but are of high interest to spectators (e.g., top-down view showing a shooting player and an eliminated player).

The identified and/or generated camera perspectives are provided as input to the AI narration trainer 330 which is now configured to apply the broadcasting/narration model 331. For example, the trainer 330 may be implemented as or within AI server 260. The broadcasting/narration model 331 is configured to generate narration for a scene of a corresponding and identified zone-of-interest. In particular, the broadcasting/narration model 331 is configured to select pertinent statistics and facts for the scene in the gaming session through artificial intelligence. In one embodiment, the statistics and facts are selected from a group of statistics and facts generated based on metadata and player statistics for the gaming session. For example, metadata 702 and player statistics for players 1-N in a gaming session is delivered to the AI gaming and player statistics and facts trainer 340 which is now configured to apply the statistics/facts model 341 to generate all the statistics and facts for that gaming session. For example, the trainer 340 may be implemented as or within AI server 260.

In one embodiment, the statistics/facts model 341 and/or the narration model 331, taken alone or in combination, are configured to identify and/or generate statistics and facts for the corresponding scene of a corresponding zone-of-interest that are of high interest to one or more spectators. In that manner, the selected statistics and facts may be used to generate narration 335 using artificial intelligence. For example, the AI selected statistics and facts may be weaved into an appropriate template to generate the narration 335, wherein the template may be directed to the particular scene that is being viewed, or may be directed to the targeted spectators (e.g., preference for excitable narration). In addition, one or more filtering processes may be performed on the narration 335. For example, a cultural filter may be applied to the narration, wherein the cultural filter is applicable to the targeted spectators. In addition, a language filter may be applied to the narration 335, such that the commentary and/or narration 335 may be provided in a preferred language.

As shown, the highlight reel generator is able to package the rendered views of a scene for an identified zone-of-interest of a gaming session along with the AI generated narration. The highlight reel may be streamed through network 150 to one or more spectators 720. In that manner, one or more spectators 720 are able to view the most exciting scenes of a particular gaming session that is supported with narration built to generate the most interest for spectators, wherein the views may be provided in real-time for a live gaming session, or may be generated for replays of a corresponding gaming session, wherein the replays may be streamed during the gaming session, or after the gaming session has ended.

In one embodiment, a second highlight reel may be generated from another first highlight reel of a gaming session. That is, the first highlight reel is provided as input into the highlight engine 240, wherein the second highlight reel is generated as an output. That is, one or more renderings of replays (e.g., highlight reel) may be made available for viewing by other spectators. In addition, other subsequent highlight reels may be generated from the second highlight reel, such that a chain of highlight reels may be generated.

In one embodiment, the rendered views of a gaming session or the highlight reels of the gaming session may be provided within the context of a live event, such as an eSports event, wherein a multi-player gaming session is performed live in front of an audience. Specifically, multiple spectators may view the live event in a common location (e.g., eSports arena) where there may be one or more displays set up to be viewable by multiple spectators. In addition, spectators can have one or more personal screens that they watch in addition to the screens viewable by multiple spectators. Each spectator may actively control which views of the event are shown on their personal screens using embodiments of the present disclosure. That is, the spectator controls the camera positioning for the renderings of the live game play using AI models previously described. For example, camera perspectives may be fixed in space, or follow individual players or teams, or configured to capture various interesting aspects of the action through artificial intelligence.

Figure 8:
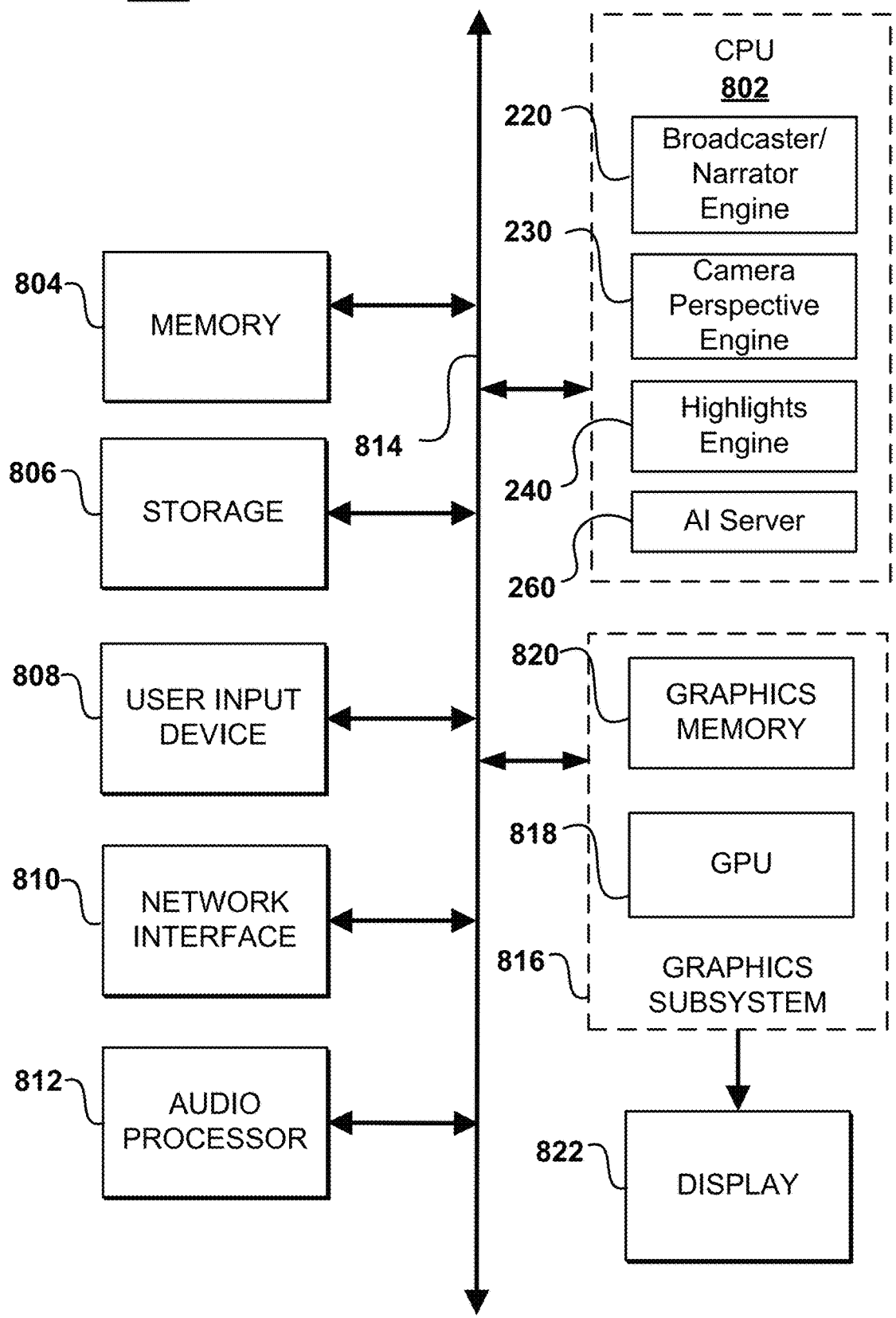
FIG. 8 illustrates components of an example device that can be used to perform aspects of the various embodiments of the present disclosure.

FIG. 8 illustrates components of an example device 800 that can be used to perform aspects of the various embodiments of the present disclosure. For example, FIG. 8 illustrates an exemplary hardware system suitable for generating one or more renderings of a scene of a gaming application through artificial intelligence (AI), and further suitable for generating narration for the scene and/or the renderings of the scene of the gaming application through AI, in embodiments of the present disclosure. This block diagram illustrates a device 800 that can incorporate or can be a personal computer, a server computer, gaming console, mobile device, or other digital device, each of which is suitable for practicing an embodiment of the invention. Device 800 includes a central processing unit (CPU) 802 for running software applications and optionally an operating system. CPU 802 may be comprised of one or more homogeneous or heterogeneous processing cores.

In accordance with various embodiments, CPU 802 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 804 stores applications and data for use by the CPU 802 and GPU 816. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, graphics subsystem including GPU 816, memory 804, data storage 806, user input devices 808, network interface 810, and audio processor 812 are connected via one or more data buses 822.

A camera perspective engine 230 may be configured within the CPU 802 or separate from the CPU 802 as stand-alone hardware, and is further configured to identify camera perspectives of scenes for zones-of-interest previously identified by a zone-of-interest AI model as being interesting to spectators, wherein the camera perspectives are also identified by an AI model as being interesting to the spectators, in accordance with one embodiment of the present disclosure. A broadcaster/narrator engine 220 may be configured within the CPU 802 or separate from the CPU 802 as stand-alone hardware, and is further configured to generate narration using an AI model for the scenes of the zones-of-interest previously identified by the zone-of-interest AI model as being interesting to spectators, wherein the narration generated may be tailored to the camera perspectives identified by the AI camera perspective model, in accordance with one embodiment of the present disclosure. An AI server 260 may be configured for training and/or implementing the AI camera perspective model and for training and/or implementing the AI broadcasting/narration model. A highlights engine 240 may be configured within the CPU 802 or separate from the CPU 802 as stand-alone hardware, and is further configured to generate a highlight reel of a gaming session including one or more players playing a gaming application, wherein the highlight reel is generated using AI models that can identify spectator zones-of-interest in a plurality of gaming session of a plurality of gaming applications, to identify interesting camera perspectives of those identified spectator zones-of-interest, and to provide narration for the scenes of those identified spectator zones-of-interest, in accordance with embodiments of the present disclosure.

A graphics subsystem 814 is further connected with data bus 822 and the components of the device 800. The graphics subsystem 814 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 816, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810, or to be projected by projection system 840. Display device 810 can be any device capable of displaying visual information in response to a signal from the device 800, including CRT, LCD, plasma, and OLED displays. Device 800 can provide the display device 810 with an analog or digital signal, for example.

Other embodiments for optimizing the graphics subsystem 814 could include multi-tenancy GPU operations where a GPU instance is shared between multiple applications, and distributed GPUs supporting a single game. The graphics subsystem 814 could be configured as one or more processing devices.

For example, the graphics subsystem 814 may be configured to perform multi-tenancy GPU functionality, wherein one graphics subsystem could be implementing graphics and/or rendering pipelines for multiple games, in one embodiment. That is, the graphics subsystem 814 is shared between multiple games that are being executed.

In other embodiments, the graphics subsystem 814 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

While specific embodiments have been provided to demonstrate the generation of one or more renderings of a scene of a gaming application through artificial intelligence (AI), and/or to the generation of narration for the scene and/or the renderings of the scene of the gaming application through AI, those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
    receiving at a server, game state data and user data from a plurality of game plays of a plurality of players playing a video game;
    generating at the server statistics and facts for a gaming session that is live of the video game based on the game state data and the user data, wherein the plurality of game plays includes game plays of the gaming session;
    generating at the server a camera perspective of a scene of the gaming session using artificial intelligence, wherein the camera perspective is selected by a spectator; and
    automatically generating in real-time at the server, using the artificial intelligence, machine based narration for the camera perspective of the scene of the gaming session based on the game state data and the user data.

2. The method of claim 1, wherein the generating the machine based narration includes:
    generating the machine based narration using an AI model configured to select for the machine based narration a subset of the statistics and facts generated for the gaming session having a potential spectator interest.

3. The method of claim 2, further comprising:
    selecting the subset of the statistics and the facts generated for the gaming session that have a highest potential spectator interest.

4. The method of claim 1, further comprising:
    identifying one or more spectator zones-of-interest that are likely to be viewed by at least one spectator, each of the one or more spectator zones-of-interest associated with one or more scenes of the gaming session,
    wherein one or more camera perspectives provide one or more views into each scene of the one or more scenes.

5. The method of claim 4, further comprising:
    streaming the camera perspective of the scene and the machine based narration to a device of the spectator over a network.

6. The method of claim 4, further comprising:
    wherein a spectator zone-of-interest that is identified is selected by the spectator.

7. The method of claim 4, further comprising:
    generating a highlight of the gaming session of the video game,
    wherein the highlight includes at least one camera perspective of a plurality of image frames of the scene and the machine based narration.

8. The method of claim 1, wherein the generating the machine based narration includes:
    determining a scenario of the scene in the gaming session based on the statistics and the facts generated for the gaming session and the game state data and the user data from the plurality of game plays; and
    using a narration template built for the scenario.

9. A non-transitory computer-readable medium for performing a method, the computer-readable medium comprising:
    program instructions for receiving at a server, game state data and user data from a plurality of game plays of a plurality of players playing a video game;
    program instructions for generating at the server statistics and facts for a gaming session of the video game based on the game state data and the user data, wherein the plurality of game plays includes game plays of the gaming session;
    program instructions for generating at the server a camera perspective of a scene of the gaming session using artificial intelligence, wherein the camera perspective is selected by a spectator; and
    program instructions for automatically generating in real-time at the server, using the artificial intelligence, machine based narration for the camera perspective of the scene of the gaming session based on the game state data and the user data.

10. The non-transitory computer-readable medium of claim 9, wherein the program instructions for generating the narration includes:
   program instructions for generating the machine based narration using an AI model configured to select for the machine based narration a subset of the statistics and the facts generated for the gaming session having a potential spectator interest.

11. The non-transitory computer-readable medium of claim 10, further comprising:
   program instructions for selecting the subset of the statistics and the facts generated for the gaming session that have a highest potential spectator interest.

12. The non-transitory computer-readable medium of claim 9, further comprising:
   program instructions for identifying one or more spectator zones-of-interest that are likely to be viewed by at least one spectator, each of the one or more spectator zones-of-interest associated with one or more scenes of the gaming session, wherein one or more camera perspectives provide one or more views into each scene of the one or more scenes; and
   program instructions for streaming the camera perspective of the scene and the narration to a device of a spectator over a network.

13. The non-transitory computer-readable medium of claim 12, further comprising:
   program instructions for generating a highlight of the gaming session of the video game,
   wherein the highlight includes at least one camera perspective of a plurality of image frames of the scene and the machine based narration.

14. The non-transitory computer-readable medium of claim 9, wherein the program instructions for generating the machine based narration includes:
   program instructions for determining a scenario of the scene in the gaming session based on the statistics and the facts generated for the gaming session and the game state data and the user data from the plurality of game plays; and
   program instructions for using a narration template built for the scenario.

15. A computer system comprising:
   a processor;
   memory coupled to the processor and having stored therein instructions that, if executed by the computer system, cause the computer system to execute a method, comprising:
      receiving at a server, game state data and user data from a plurality of game plays of a plurality of players playing a video game;
      generating at the server statistics and facts for a gaming session of the video game based on the game state data and the user data, wherein the plurality of game plays includes game plays of the gaming session;
      generating at the server a camera perspective of a scene of the gaming session using artificial intelligence, wherein the camera perspective is selected by a spectator; and
      automatically generating in real-time at the server, using the artificial intelligence, machine based narration for the camera perspective of the scene of the gaming session based on the game state data and the user data.

16. The computer system of claim 15, wherein in the method the generating the machine based narration includes:
   generating the machine based narration using an AI model configured to select for the machine based narration a subset of the statistics and the facts generated for the gaming session having a potential spectator interest.

17. The computer system of claim 16, the method further comprising:
   selecting the subset of the statistics and the facts generated for the gaming session that have a highest potential spectator interest.

18. The computer system of claim 15, the method further comprising:
   identifying one or more spectator zones-of-interest that are likely to be viewed by at least one spectator, each of the one or more spectator zones-of-interest associated with one or more scenes of the gaming session, wherein one or more camera perspectives provide one or more views into each scene of the one or more scenes; and
   streaming the camera perspective of the scene and the machine based narration to a device of the spectator over a network.

19. The computer system of claim 18, the method further comprising:
   generating a highlight of the gaming session of the video game,
   wherein the highlight includes at least one camera perspective of a plurality of image frames of the scene and the machine based narration.

20. The computer system of claim 15, wherein in the method the generating the machine based narration includes:
   determining a scenario of the scene in the gaming session based on the statistics and the facts generated for the gaming session and the game state data and the user data from the plurality of game plays; and
   using a narration template built for the scenario.

* * * * *